US012748532B2

(12) United States Patent
Kim et al.

(10) Patent No.: US 12,748,532 B2
(45) Date of Patent: Sep. 29, 2026

(54) MEMORY DEVICE AND MEMORY SYSTEM

(71) Applicant: SAMSUNG ELECTRONICS CO., LTD., Suwon-si (KR)

(72) Inventors: Ki-Heung Kim, Suwon-si (KR); ChangSik Yoo, Suwon-si (KR); Jeongdon Ihm, Suwon-si (KR); Hyongryol Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/805,709

(22) Filed: Aug. 15, 2024

(65) Prior Publication Data

US 2025/0060886 A1 Feb. 20, 2025

(30) Foreign Application Priority Data

Aug. 18, 2023 (KR) ........................ 10-2023-0108520
Feb. 16, 2024 (KR) ........................ 10-2024-0022950

(51) Int. Cl.
*G06F 3/06* (2006.01)

(52) U.S. Cl.
CPC .......... *G06F 3/0619* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 11,281,574 B2 | 3/2022 | Hwang et al. | |
| 11,288,188 B1 | 3/2022 | Tummala et al. | |
| 11,379,148 B2 | 7/2022 | No | |
| 11,747,988 B2 | 9/2023 | Ahn et al. | |
| 2010/0269018 A1* | 10/2010 | Clark | G06F 11/1629 714/763 |
| 2020/0058341 A1* | 2/2020 | Villa | G11C 11/2257 |
| 2022/0121398 A1* | 4/2022 | Nale | G11C 11/408 |
| 2023/0021622 A1 | 1/2023 | Cho et al. | |
| 2023/0083020 A1* | 3/2023 | Chi | G11C 11/4096 711/105 |
| 2023/0205428 A1 | 6/2023 | Kim et al. | |
| 2023/0352064 A1 | 11/2023 | Ayyapureddi | |
| 2024/0194284 A1* | 6/2024 | Laurent | G11C 29/52 |

FOREIGN PATENT DOCUMENTS

| | | |
|---|---|---|
| KR | 10-2019-0087757 | 7/2019 |
| KR | 10-2020-0122685 | 10/2020 |
| KR | 10-2023-0014032 | 1/2023 |
| KR | 10-2023-0017006 | 2/2023 |
| KR | 10-2023-0099477 | 7/2023 |

* cited by examiner

*Primary Examiner* — Jared I Rutz
*Assistant Examiner* — Alexander J Yoon
(74) *Attorney, Agent, or Firm* — Fish & Richardson P.C.

(57) ABSTRACT

A memory device includes at least one bank including at least a first sub-bank and a second sub-bank disposed in a wordline direction. The first sub-bank may include a normal data region connected to a plurality of first wordlines and storing normal data, the second sub-bank may include a metadata region connected to a plurality of second wordlines and storing metadata corresponding to the normal data, the plurality of first wordlines may match the plurality of second wordlines to form a plurality of wordline pairs, and the first sub-bank and the second sub-bank may share a row hammer region storing a number of access times to the plurality of wordline pairs.

20 Claims, 23 Drawing Sheets

310_1

MEMORY DEVICE AND MEMORY SYSTEM

CROSS-REFERENCE TO RELATED APPLICATION(S)

This U.S. non-provisional application claims priority under 35 USC § 119 to Korean Patent Application Nos. 10-2023-0108520, field on Aug. 18, 2023, and 10-2024-0022950, filed on Feb. 16, 2024, in the Korean Intellectual Property Office, the disclosures of which are herein incorporated by reference in their entirety.

BACKGROUND

Memory devices are used to store data and are classified into volatile and nonvolatile memory devices. Volatile memory devices lose their stored data when their power supplies are interrupted. A dynamic random access memory (DRAM) is a volatile memory device used in various fields such as mobile systems, servers, and graphics devices.

When a specific wordline is aggressively accessed, data stored in memory cells included in a wordline adjacent to a corresponding memory cell row may be lost. This phenomenon is called a row hammer effect. The row hammer effect may impact the integrity of the data stored in the DRAM.

SUMMARY

This disclosure provides a memory device that may be implemented in a small area while preventing a row hammer effect.

According to some implementations, a memory device includes at least one bank. The at least one bank includes a first sub-bank and a second sub-bank. The first sub-bank includes a plurality of first wordlines extending in a first direction and a normal data region connected to the plurality of first wordlines. The normal data region is configured to store normal data. The second sub-bank is disposed away from the first sub-bank in the first direction. The second sub-bank includes a plurality of second wordlines extending in the first direction and a metadata region connected to a plurality of second wordlines and configured to store metadata of the normal data. The plurality of first wordlines and the plurality of second wordlines are matched to form a plurality of wordline pairs. The at least one bank further includes a row hammer region shared by the first sub-bank and the second sub-bank. The row hammer region is configured to store a number of access times to the plurality of wordline pairs.

According to some implementations, a memory device includes at least one bank. The at least one bank includes a first sub-bank and a second sub-bank. The first sub-bank includes a plurality of first wordlines extending in a wordline direction and a plurality of first mats. The second sub-bank is disposed away from the first sub-bank in the wordline direction. The second sub-bank includes a plurality of second wordlines and a plurality of second mats. The at least one bank further includes a first row decoder connected to the first sub-bank through the plurality of first wordlines, a plurality of first column select lines, a plurality of second column select lines, a first column decoder connected to the first sub-bank through the plurality of first column select lines, a second row decoder connected to the second sub-bank through the plurality of second wordlines, and a second column decoder connected to the second sub-bank through a plurality of second column select lines. Each of the plurality of first mats includes a normal data region connected to a portion of the plurality of first wordlines and configured to store normal data. Each of the plurality of second mats includes a metadata region connected to a portion of the plurality of second wordlines and configured to store metadata corresponding to the normal data. The plurality of first wordlines and the plurality of second wordlines are matched to form a plurality of wordline pairs. At least one of the plurality of first mats included in the first sub-bank includes one or more count cells configured to store count data that includes a number of accesses to the plurality of wordline pairs.

According to some implementations, a memory system includes a memory device including at least one bank. The at least one bank includes a first sub-bank and a second sub-bank. The first sub-bank includes a plurality of first wordlines and a normal data region connected to the plurality of first wordlines. The second sub-bank is disposed away from the first sub-bank in a wordline direction. The second sub-bank includes a plurality of second wordlines and a metadata region connected to the plurality of second wordlines and configured to store metadata corresponding to the normal data. The at least one bank further includes a memory controller configured to control the memory device. The plurality of first wordlines and the plurality of second wordlines are matched to form a plurality of wordline pairs. The at least one bank further includes a row hammer region shared by the first sub-bank and the second sub-bank and configured to store a number of accesses to the plurality of wordline pairs.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Hereinafter, implementations will be described with reference to the accompanying drawings.

Figure 1A:
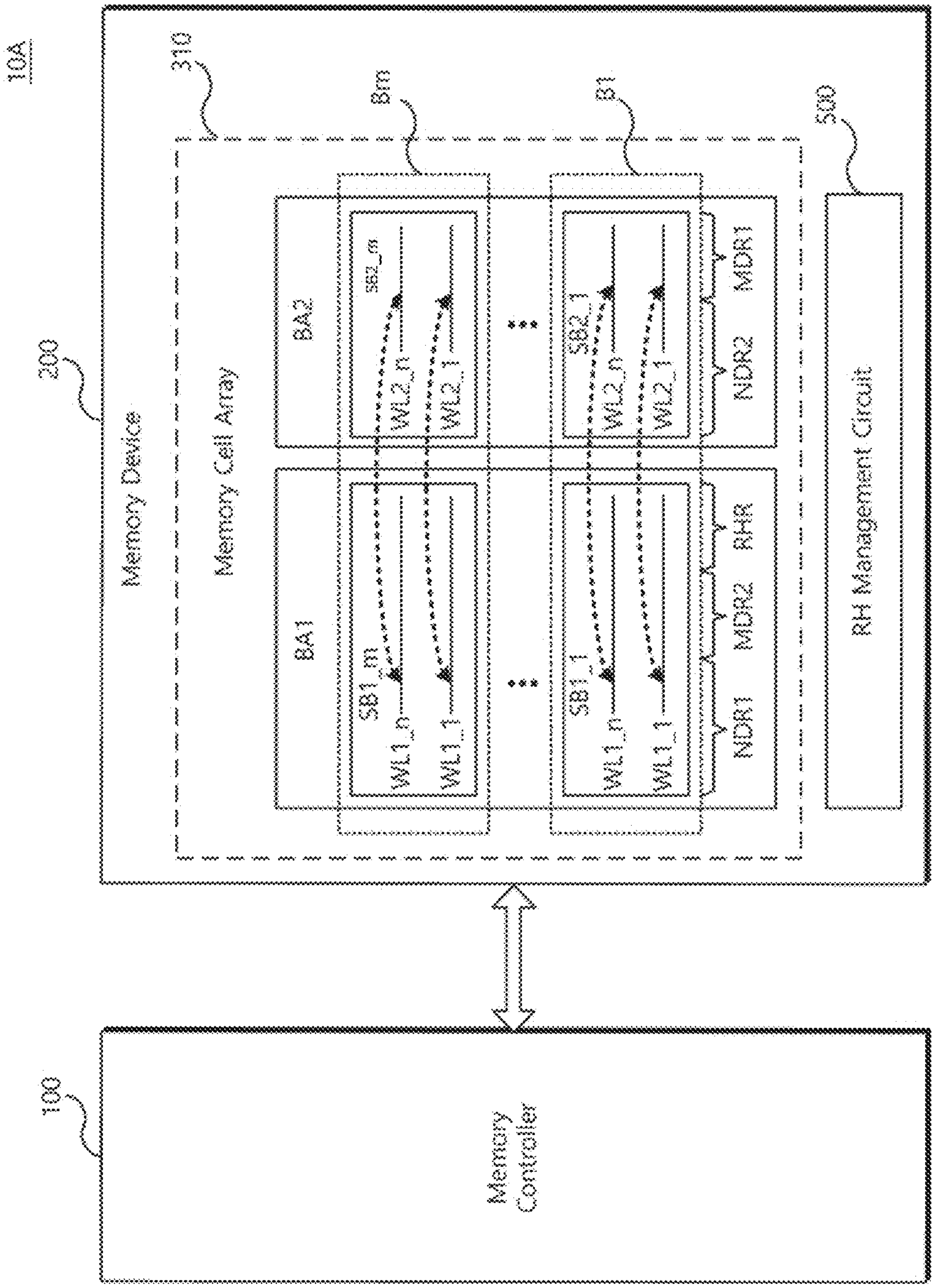
FIG. 1A is a block diagram illustrating a memory system according to some implementations.

FIG. 1A is a block diagram illustrating a memory system according to some implementations.

A memory system 10A according to some implementations may include a plurality of banks. Each of the plurality of banks may include a first sub-bank and a second sub-bank disposed away from the first sub-bank in a wordline direction (e.g., a direction in which one or more wordlines extend). In some implementations, the first sub-bank and the second sub-bank may correspond to different global input/output lines GIO.

The memory system 10A may manage a number of accesses to each of a plurality of wordlines to prevent a row hammer effect caused by intensive accesses to a specific wordline. To this end, the memory system 10A may perform a read-modify-write (RMW) operation to read count data corresponding to a target wordline in an active state, update the read count data, and rewrites the updated count data.

In some implementations, the first and second sub-banks may share the count data. For example, when the count data is stored in one of the sub-banks, the other sub-bank may perform an RMW operation using the count data. Accordingly, a space required to store the count data may be significantly reduced. As a result, the memory system 10A may be implemented in a small area while preventing the row hammer effect.

A more detailed description will now be provided with reference to FIG. 1A. The memory system 10A may include a memory controller 100 and a memory device 200.

The memory controller 100 may control the memory device 200. For example, the memory controller 100 may control the memory device 100 based on requests from a processor supporting various applications such as a server application, a personal computer (PC) application, or a mobile application. For example, the memory controller 100 may be included in a host including a processor, and may control the memory device 200 based on the requests from the processor.

The memory controller 100 may transmit commands and/or addresses to the memory device 200 to control the memory device 200. In addition, the memory controller 100 may transmit data to the memory module 100 or receive data from the memory device 200.

In some implementations, the memory device 200 may operate in first write mode or second write mode.

The memory controller 100 may control the memory device 200 to operate in first write mode or second write mode. For this control, the memory controller 100 may adjust a value of a specific bit of an additional storage space, such as a mode register included in the memory device 200, to perform the above control. For example, when the value of the specific bit is set to 0, the memory device 200 may operate in first write mode. When the value of the specific bit is set to 1, the memory device 200 may operate in second write mode.

For example, the memory controller 100 may control the memory device 200 to simultaneously write or read normal data and metadata through a wordline corresponding to the normal data and a wordline corresponding to the metadata.

In some implementations, the memory system 10A may turn off the metadata mode and also operate in normal mode. In normal mode, a wordline assigned for metadata in metadata mode may also be assigned for normal data. Accordingly, in normal mode, the memory system 10A may activate at least a portion of a plurality of wordlines included in the memory device 200 to write or read normal data in or from the memory device 120. In addition, the operation of the memory system 100 in normal mode may follow an operation in dynamic random access memory (DRAM), double data rate (DDR) 4 (DDR4), synchronous SRAM (SDRAM), DDR5 SDRAM, DDR6 SDRAM, low power DDR4 (LPDDR4) SDRAM, LPDDR5 SDRAM, or LPDDR6 SDRAM.

The memory device 200 may receive data from the memory controller 100 and store the received data. The memory device 200 may read the stored data in response to a request from the memory controller 100 and transmit the read data to the memory controller 100.

In some implementations, the memory device 200 may be a memory device including volatile memory cells. For example, the memory device 200 may be one of various DRAM devices such as a double data rate synchronous dynamic random access memory (DDR SDRAM) device, a DDR2 SDRAM device, a DDR3 SDRAM device, a DDR4 SDRAM device, a DDR5 SDRAM device, a DDR6 SDRAM device, a low power double data rate (LPDDR) SDRAM device, an LPDDR2 SDRAM device, an LPDDR3 SDRAM device, an LPDDR4 SDRAM device, an LPDDR4×SDRAM device, an LPDDR5 SDRAM device, a graphics double data rate synchronous graphics random access memory (GDDR SGRAM) device, a GDDR2 SGRAM device, a GDDR3 SGRAM device, a GDDR4 SGRAM device, a GDDR5 SGRAM device, or a GDDR6 SGRAM device.

In some implementations, the memory device 200 may be a stacked memory device in which DRAM dies are stacked, such as a high bandwidth memory (HBM) device, an HBM2 device, or an HBM3 device.

In some implementations, the memory device 200 may be a memory module such as a dual in-line memory module (DIMM). For example, the memory module 100A may be a registered DIMM (RDIMM), a load reduced DIMM (LRDIMM0, an unbuffered DIMM (UDIMM), a fully buffered DIMM (FB-DIMM), a small outline DIMM (SO-DIMM). However, this is only an example, and the memory device 200 may be another memory module such as a single in-line memory module (SIMM).

In some implementations, the memory device 200 may be an SRAM device, a NAND flash memory device, a NOR flash memory device, an RRAM device, an FRAM device, a PRAM device, a TRAM device, or an MRAM device.

The memory device 200 includes a memory cell array 310 and a row hammer management circuit 500.

The memory cell array 310 may include a plurality of bank arrays, and each of the bank arrays may include memory cells storing data. For example, the memory cell array 310 includes a first bank array BA1 and a second bank array BA2, and each of the first and second bank arrays BA1 and BA2 may include memory cells.

For ease of description, an example will be provided in which each bank array includes DRAM cells. However, this is only an example, and each bank array may be implemented to include volatile memory cells other than DRAM cells. Alternatively, each bank array may be implemented to include the same type of memory cells, or may be implemented to include different types of memory cells.

The first bank array BA1 includes a plurality of sub-banks SB1_1 to SB1_m. The plurality of sub-banks SB1_1 to SB1_m included in the first bank array BA1 may share the same global input/output line.

The second bank array BA2 includes a plurality of sub-banks SB2_1 to SB2_m. The plurality of sub-banks SB2_1 to SB2_m included in the second bank array BA2 may share the same global input/output line.

Each of the plurality of sub-banks SB1_1 to SB1_m of the first bank array BA1 includes a first normal data region NDR1 and a second metadata region MDR2. Each of the plurality of sub-banks SB2_1 to SB2_m of the second bank array BA2 includes a second normal data region NDR2 and a first metadata region MDR1.

Memory cells of the first and second normal data regions NDR1 and NDR2 may store normal data. Memory cells of the first and second metadata regions MDR1 and MDR2 may store metadata. The metadata may refer to data used to improve the performance or enhance the security of a memory device. For example, the metadata may be parity data to perform an error correction operation on corresponding normal data. For example, the metadata may include information on the type, length, and attributes of corresponding normal data, but implementations are not limited thereto.

In some implementations, a plurality of banks B1 to Bm may each be defined to include different sub-banks disposed in a wordline direction.

For example, the first bank B1 includes a 1_1-th sub-bank SB1_1 of the first bank array BA1 and a 2_1-th sub-bank SB2_1 of the second bank array BA2. In some implementations, the 1_1-th sub-bank SB1_1 and the 2_1-th sub-bank SB2_1 may correspond to different global I/O lines, respectively. For example, the 1_1-th sub-bank SB1_1 and the 2_1-th sub-bank SB2_1 may be connected to different global I/O lines. Thus, the 1_1-th sub-bank SB1_1 and the 2_1-th sub-bank SB2_1 may input or output data simultaneously.

Similarly, the m-th bank Bm includes a 1_m-th sub-bank SB1_m of the first bank array BA1 and a 2_m-th sub-bank SB2_m of the second bank array BA2. In some implementations, the 1_m-th sub-bank SB1_m and the 2_m-th sub-bank SB2_m may correspond to different global I/O lines, respectively. For example, the 1_m-th sub-bank SB1_m and the 2_m-th sub-bank SB2_m may be connected to different global I/O lines. Thus, the 1_m-th sub-bank SB1_m and the 2_m-th sub-bank SB2_m may input or output data simultaneously.

In some implementations, normal data and corresponding metadata may be stored in sub-banks included in the same bank.

For example, the first bank B1 includes 1_1-th sub-bank SB1_1 and 2_1-th sub-bank SB2_1, and first normal data may be stored in a first normal data region NDR1 of the 1_1-th sub-bank SB1_1. In some implementations, first metadata corresponding to the first normal data of the 1_1-th sub-bank SB1_1 may be stored in a first metadata region MDR1 of the 2_1-th sub-bank SB2_1.

For example, second normal data may be stored in a second normal data region NDR2 of the 2_1-th sub-bank SB2_1. In some implementations, second metadata corresponding to the second normal data of the 2_1-th sub-bank SB2_1 may be stored in a second metadata region MDR2 of the 1_1-th sub-bank SB1_1.

As described above, the normal data and the corresponding metadata may be distributed and stored in sub-banks included in the same bank. In some implementations, the sub-banks included in the same bank may be connected to different global I/O lines, so that the normal data and the corresponding metadata may be input or output simultaneously.

In some implementations, a plurality of wordlines of the normal data region may correspond to a plurality of wordlines of the metadata region, respectively. For example, a plurality of wordlines of the normal data region and a plurality of wordlines of the corresponding metadata region may form pairs.

In some implementations, sub-banks included in the same bank may each include a plurality of wordlines, and a plurality of wordlines included in one sub-bank may correspond to a plurality of wordlines included in another sub-bank, respectively. For example, the plurality of wordlines included in one sub-bank and the plurality of wordlines included in another sub-bank may be respectively matched. Accordingly, wordline pairs may be formed.

For example, a 1_1-th wordline WL1_1 of the 1_1-th sub-bank SB1_1 may correspond to a 2_1-th wordline WL2_1 of the 2_1-th sub-bank SB2_1, and the 1_1-th wordline WL1_1 and the 2_1-th wordline WL2_1 may form a first wordline pair. Similarly, a 1_n-th wordline WL1_n of the 1_1-th sub-bank SB1_1 may correspond to a 2_n-th wordline WL2_n of the 2_1-th sub-bank SB2_1, and the 1_n-th wordline WL1_n and the 2_n-th wordline WL2_n may form an n-th wordline pair.

In some implementations, the normal data and the corresponding metadata may be stored in a normal data region and a metadata region of the same wordline pair.

For example, if first normal data is stored in memory cells connected to the 1_1-th wordline WL1_1 of the first normal data region NDR1 of the 1_1-th sub-bank SB1_1, first metadata corresponding to the first normal data may be stored in memory cells connected to the 2_1-th wordline WL2_1 of the first metadata region MDR1 of the 2_1-th sub-bank SB2_1. Similarly, when n-th normal data is stored in memory cells connected to the 1_n-th wordline WL1_n of the first normal data region NDR1 of the 1_1-th sub-bank SB1_1, n-th metadata corresponding to the n-th normal data may be stored in memory cells connected to a 2_n-th wordline WL2_n of the first metadata region MDR1 of the 2_1-th sub-bank SB2_1.

For example, when the first normal data is stored in memory cells connected to the 2_1-th wordline WL2_1 of the second normal data region NDR2 of the 2_1-th sub-bank SB2_1, the first metadata corresponding to the first normal data may be stored in memory cells connected to the 1_1-th wordline WL1_1 of the second metadata region MDR2 of the 1_1-th sub-bank SB1_1. Similarly, when the n-th normal data is stored in memory cells connected to a 2_n-th wordline WL2_n of the second normal data region NDR2 of the 2_1-th sub-bank SB2_1, the n-th metadata corresponding to the n-th normal data may be stored in the memory cells connected to the 1_n-th wordline WL1_n of the second metadata region MDR2 of the 1_1-th sub-bank SB1_1.

As described above, a plurality of wordlines included in one sub-bank and a plurality of wordlines included in another sub-bank may form a wordline pair, and thus a plurality of pieces of metadata for a plurality of pieces of normal data stored in the 1_1-th sub-bank SB1_1 may be distributed and stored in wordlines of the 2_1-th sub-bank SB2_1, and a plurality of pieces of metadata for a plurality of pieces of normal data stored in the 2_1-th sub-bank SB2_1 may be stored in wordlines of the 1_1-th sub-bank SB1_1. Accordingly, the plurality of pieces of metadata may be intensively stored in a specific wordline. As a result, occurrence of row hammer caused by an intensive access to the specific wordline may be suppressed.

In some implementations, at least one of the plurality of sub-banks SB1_1 to SB1_m of the first bank array BA1 and/or the plurality of sub-banks SB2_1 to SB2_m of the second bank array BA2 includes a row hammer region RHR. For example, the plurality of sub-banks SB1_1 to SB1_m of the first bank array BA1 may include a row hammer region RHR, as illustrated in FIG. 1A. However, this is an example, and implementations are not limited thereto. For example, the row hammer region RHR may be formed in the second bank array BA2. Alternatively, the row hammer region RHR may be formed in a portion of the first bank array BA1 and a portion of the second bank array BA2.

The row hammer region RHR may include a count cell. The count cell may refer to a memory cell storing a number of accesses to a corresponding wordline as count data. In some implementations, sub-banks included in the same bank may share the count data with each other.

For example, count data for the 1_1-th wordline WL1_1 of the 1_1-th sub-bank SB1_1 may be stored in a count cell of the row hammer region RHR. In some implementations, the 1_1-th wordline WL1_1 of the 1_1-th sub-bank SB1_1 and the 2_1-th wordline WL2_1 of the 2_1-th sub-bank SB2_1 form a wordline pair, so that count data for the 2_1-th wordline WL2_1 may be the same as the count data for the 1_1-th wordline WL1_1.

Accordingly, when the 2_1-th wordline WL2_1 of the 2_1-th sub-bank SB2_1 is activated (for example, when a read or write operation is performed on the 2_1-th wordline WL2_1), an RMW operation may be performed using the count data stored in the count cell of the row hammer region RHR of the 1_1-th sub-bank SB1_1. For example, the 2_1-th sub-bank SB2_1 does not include an additional count cell and may share count cells of the row hammer region RHR of the 1_1-th sub-bank SB1_1.

As described above, the sub-banks included in the same bank may share the count data with each other to significantly reduce a space required to store the count data.

Continuing to refer to FIG. 1A, the row hammer management circuit 500 may manage a number of accesses of each of the plurality of wordlines based on a command received from the memory controller 100. For example, when an active command is received from the memory controller 100 and the target wordline is activated, the row hammer management circuit 500 may count a number of activation times corresponding to the activated wordline. Then, the row hammer management circuit 500 may store the count data, the number of activation times, in a count cell of the row hammer region RHR corresponding to the target wordline.

In some implementations, wordlines forming a wordline pair may be activated together. Accordingly, the row hammer management circuit 500 may integrally manage a number of accesses to the wordlines, forming the wordline pair, using a shared count cell.

For example, when a read request for the normal data stored in the memory cells connected to the 1_1-th wordline WL1_1 of the 1_1-th sub-bank SB1_1 is performed, the 1_1-th wordline WL1_1 may be activated. In some implementations, the 2_1-th wordline WL2_1, paired with the 1_1-th wordline WL1_1, may also be activated together to read the metadata corresponding to the read-requested normal data together.

In some implementations, the row hammer management circuit 500 may perform an RMW operation to read the count data from the count cell of the row hammer region RHR corresponding to the 1_1-th wordline WL1_1, add ‘1’ to the read count data to generate updated count data, and write the updated count data back to the count cell. In some implementations, the 2_1-th wordline WL2_1, paired with the 1_1-th wordline WL1_1, is also activated, so that the updated count data may be a value corresponding to not only the 1_1-th wordline WL1_1, but also the 2_1-th wordline WL2_1.

Similarly, when a read request for the normal data stored in the memory cells connected to the 2_1-th wordline WL2_1 of the 2_1-th sub-bank SB2_1 is performed, the 2_1-th wordline WL2_1 may be activated. In some implementations, the 1_1-th wordline WL1_1, paired with the 2_1-th wordline WL2_1, may also be activated, and the row hammer management circuit 500 may perform an RMW operation to read the count data from the count cell of the row hammer region RHR corresponding to the 1_1-th wordline WL1_1, add ‘1’ to the read count data to generate updated count data, and write the updated count data back to the count cell.

As described above, the 1_1-th sub-bank SB1_1 and the 1_2-th sub-bank SB1_2 may share the count cells of the row hammer region RHR to significantly reduce a space required to store the count data.

As described above, the memory device 200 according to some implementations may include a plurality of banks, and each of the banks may include sub-banks disposed in a wordline direction. In some implementations, sub-banks included in the same bank may share a count cell with each other. For example, the RMW operation on the sub-banks included in the same bank may be performed using the same count cell. Accordingly, the memory device 200 according to some implementations may be implemented in a small area while preventing the row hammer effect.

Figure 1B:
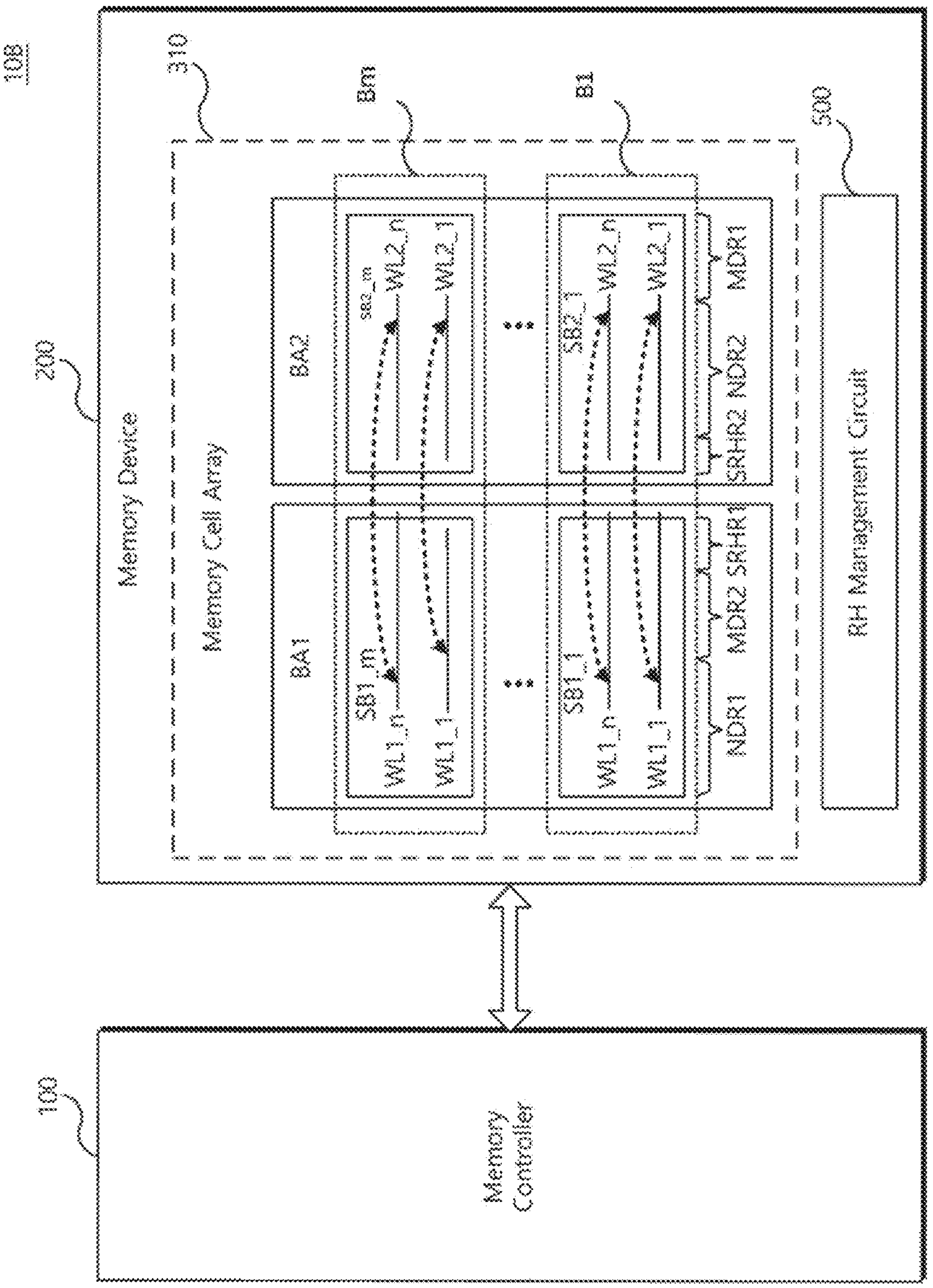
FIG. 1B is a block diagram illustrating a memory system according to some implementations.

FIG. 1B is a block diagram illustrating a memory system according to some implementations. A memory system 10B of FIG. 1B is similar to the memory system 10A of FIG. 1A. Therefore, the same or similar components are denoted by the same or similar reference numerals, and duplicate descriptions will be omitted below.

Referring to FIG. 1B, a plurality of sub-banks SB1_1 to SB1_m of a first bank array BA1 includes a first normal data region NDR1, a second metadata region MDR2, and a first sub-row hammer region SRHR1. A plurality of sub-banks SB121 to SB2_m of a second bank array BA2 includes a second normal data region NDR2, a first metadata region MDR1, and a second sub-row hammer region SRHR2.

In FIG. 1A, a row hammer region RHR including count cells has been described as being formed in the first bank array BA1. However, it will be understood that this is only an example and implementations are not limited thereto. For example, as illustrated in FIG. 1B, a portion of the row hammer regions including count cells may be formed in the first bank array BA1 and another portion thereof may be formed in the second bank array BA2. For example, a row hammer region may be divided into a first sub-row hammer region SRHR1 and a second sub-row hammer region SRHR2, and the first sub-row hammer region SRHR1 may be formed in the first bank array BA1 and the second sub-row hammer region SRHR2 may be formed in the second bank array BA2.

In some implementations, the first sub-row hammer region SRHR1 and the second sub-row hammer region SRHR2 may be disposed adjacent to each other, as illustrated in FIG. 1B. However, this is only an example, and the first sub-row hammer region SRHR1 and the second sub-row hammer region SRHR2 may be disposed in various ways in the first bank array BA1 and the second bank array BA2.

Figure 2:
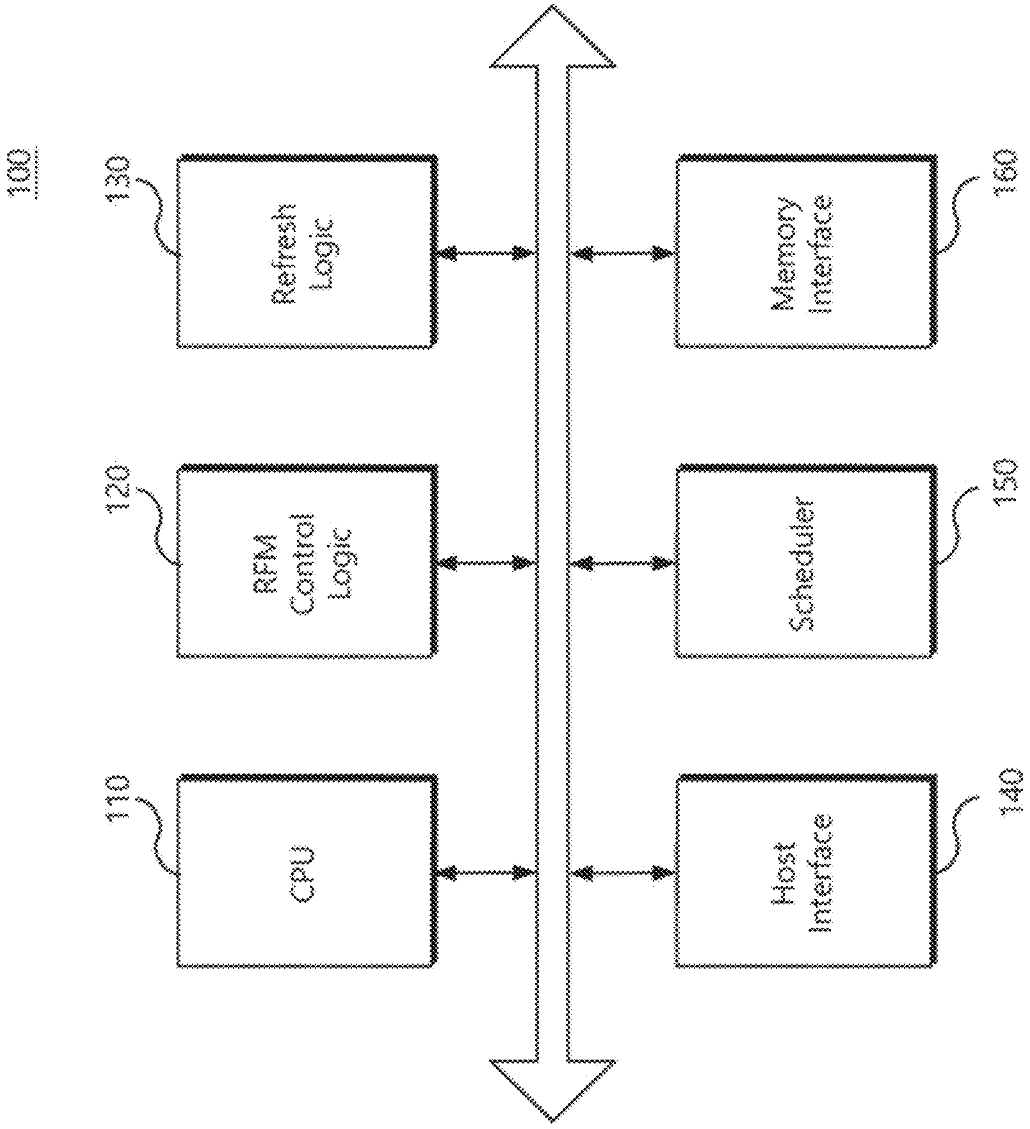
FIG. 2 is a block diagram illustrating an example of the configuration of a memory controller according to some implementations.

FIG. 2 is a block diagram illustrating an example of the configuration of a memory controller according to some implementations. A memory controller 100 of FIG. 2 may correspond to the memory controller 100 of FIG. 1A or FIG. 1B.

Referring to FIG. 2, the memory controller 100 includes a central processing unit (CPU) 110, an RFM control logic 120, a refresh logic 130, a host interface 140, a scheduler 150, and a memory interface 160, which are connected through a bus.

The CPU 110 may control the overall operation of the memory controller 100. For example, the CPU 110 may control the RFM control logic 120, the refresh logic 130, the host interface 140, the scheduler 150, and the memory interface 160.

The RFM control logic 120 may generate a refresh management (RFM) command related to row hammer. For example, when it is determined that there is an intensive access to a specific wordline, the RFM control logic 120 may generate a command to refresh the memory cells connected to a wordlines adjacent to the intensively accessed wordline.

The refresh logic 130 may generate a command to perform a normal refresh operation on the plurality of wordlines of the memory device 200. For example, the refresh logic 130 may generate an auto-refresh command to sequentially refresh the plurality of wordlines according to a refresh period.

The host interface 140 may perform interfacing with a host. The memory interface 160 may perform interfacing with the memory device 200.

The scheduler 150 may manage scheduling and transmission of sequences of commands generated within the memory controller 100.

In some implementations, the RFM control logic 120 may determine whether access is concentrated on a specific wordline based on the count data stored in the count cells of the row hammer region RHR (see FIG. 1A) or the first and second sub-row hammer regions SRHR1 and SRHR2 (see FIG. 1B). In some implementations, the sub-banks included in the same bank may share the count cell, and the RFM control logic 120 may check whether there is an intensively accessed wordline in each sub-bank, using the shared count cell.

Figure 3:
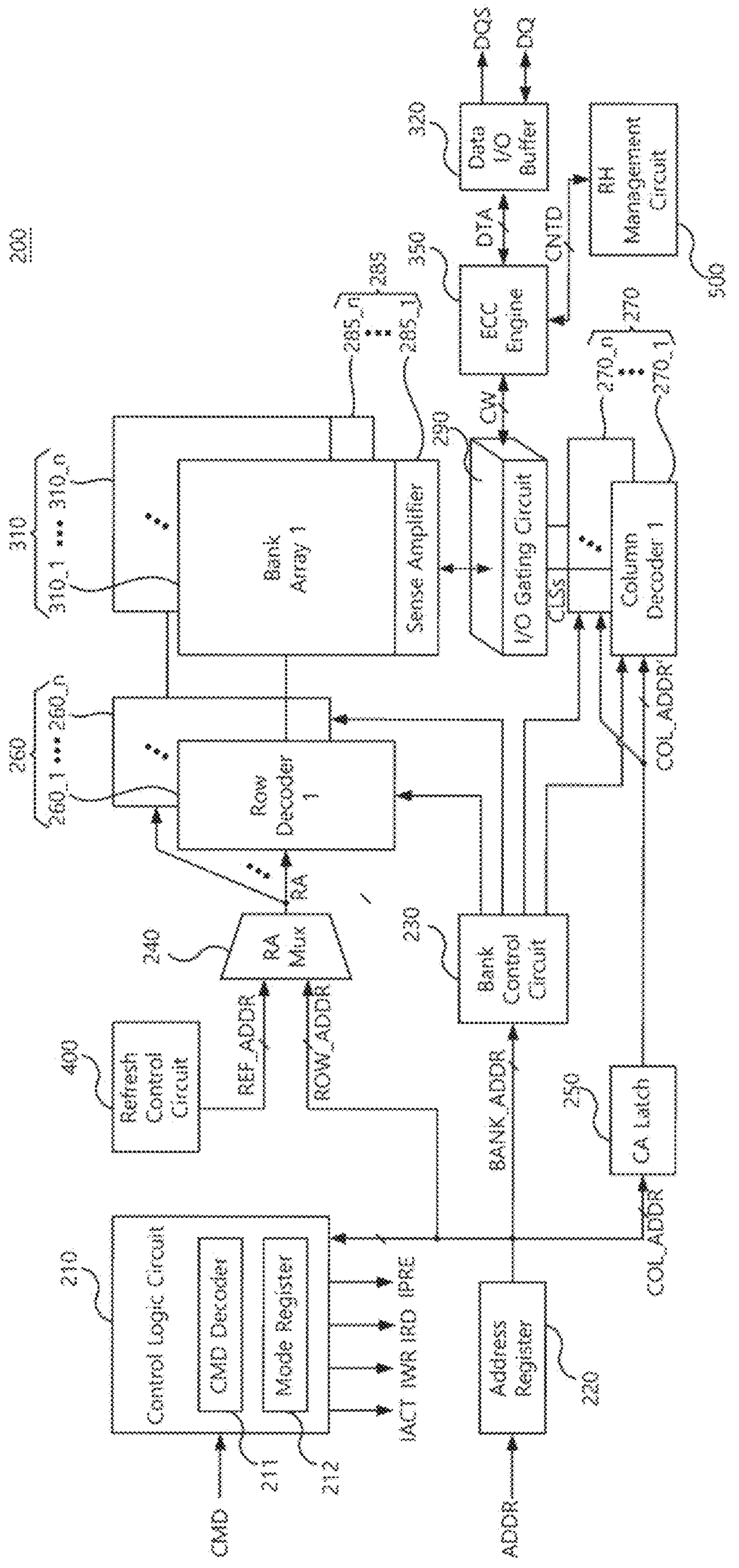
FIG. 3 is a block diagram illustrating an example of a memory device according to some implementations.

FIG. 3 is a block diagram illustrating an example of the memory device 200 according to some implementations. The memory device 200 of FIG. 3 may correspond to the memory device 200 of FIG. 1A and FIG. 1B.

Referring to FIG. 3, the memory device 200 includes a control logic circuit 210, an address register 220, a bank control logic 230, a refresh control circuit 400, a row address multiplexer 240, a column address latch 250, a row decoder group 260, a column decoder group 270, a memory cell array 310, a sense amplifier 285, an input/output gating circuit 290, an ECC engine 350, a data input/output buffer 320, and a row hammer management circuit 500.

The memory cell array 310 includes a plurality of bank arrays 310_1 to 310_*n*. Each of the plurality of bank arrays 310_1 to 310_*n* may include a plurality of memory cells. For example, each of the plurality of memory cells may be formed at an intersection of a corresponding wordline and bitline.

A row decoder group 260 includes a plurality of row decoders 260_1 to 260_*n*. Each of the plurality of row decoders 260_1 to 260_*n* may be connected to a corresponding bank array, among the plurality of bank arrays 310_1 to 310_*n*.

A sense amplifier unit 285 includes a plurality of sense amplifiers 285_1 to 285_*n*. Each of the plurality of sense amplifiers 285_1 to 285_*n* may be connected to a corresponding bank array, among the plurality of bank arrays 310_1 to 310_*n*.

The column decoder group 270 includes a plurality of column decoders 270_1 to 270_*n*. Each of the plurality of column decoders 270_1 to 270_*n* may be connected to a corresponding bank array, among the plurality of bank arrays 310_1 to 310_*n*, through column select lines CLS.

In some implementations, each of the plurality of bank arrays 310_1 to 310_*n* may include a plurality of sub-banks. Each bank may be defined to include different sub-banks of different bank arrays. For example, each of the plurality of bank arrays 310_1 to 310_*n* may include a first sub-bank and a second sub-bank. The first bank may be defined to include the first sub-bank of the first bank array 310_1 and the first sub-bank of the second bank array 310_2. The second bank may be defined to include the second sub-bank of the first bank array 310_1 and the second sub-bank of the second bank array 310_2. However, this is only an example, and the number of sub-banks included in a bank may be defined in various ways according to some implementations.

The address register 220 may receive an address ADDR including a bank address BANK_ADDR, a row address ROW_ADDR, and a column address COL_ADDR from the memory controller 100. The address register 220 may provide the received bank address BANK_ADDR to the bank control logic 230, the received row address ROW_ADDR to the row address multiplexer 240, and the received column address COL_ADDR to the column address latch 250. In addition, the address register 220 may provide the bank address BANK_ADDR and the row address ROW_ADDR to the row hammer management circuit 500 and the RMW driver 600.

The bank control logic 230 may generate bank control signals in response to the bank address BANK_ADDR. For example, among the plurality of row decoders 260_1 to 260_*n*, a row decoder corresponding to the bank address BANK_ADDR may be activated in response to the bank control signals. Among the plurality of column decoders 270_1 to 270_*n*, a column decoder corresponding to the bank address BANK_ADDR may be activated in response to the bank control signals.

The row address multiplexer 240 may receive a row address ROW_ADDR from the address register 220 and a refresh row address REF_ADDR from the refresh control circuit 400. The row address multiplexer 240 may selectively output the row address ROW_ADDR or the refresh row address REF_ADDR as a row address RA. The row address RA output from the row address multiplexer 240 may be applied to each of the plurality of row decoders 260_1 to 260_*n*.

In normal refresh mode, the refresh control circuit 400 may sequentially increase or decrease the refresh row address REF_ADDR in response to refresh signals from the control logic circuit 210.

In hammer refresh mode, the refresh control circuit 400 may receive a hammer address HADDR. The refresh control circuit 400 may output the addresses of the wordlines adjacent to the intensively accessed wordline as the refresh row address REF_ADDR, based on the hammer address HADDR.

Among the plurality of row decoders 260_1 to **260_*n*, a row decoder selected by the bank control logic 230 may activate a wordline corresponding to the row address RA output from the row address multiplexer 240**. For example, the selected row decoder may apply a wordline drive voltage to the wordline corresponding to the row address RA.

The column address latch 250 may receive the column address COL_ADDR from the address register 220 and temporarily store the received column address COL_ADDR. For example, in burst mode, a column address latch 250 may incrementally increase the received column address COL_ADDR. The column address latch 250 may apply a temporarily stored or incrementally increased column address COL_ADDR' to each of the plurality of column decoders 270_1 to **270_*n***.

Among the plurality of column decoders 270_1 to **270_*n*, a column decoder activated by the bank control logic 230 may activate a sense amplifier corresponding to the bank address BANK_ADDR and the column address COL_ADDR through the input/output gating circuit 290**.

The input/output gating circuit 290 may include circuits gating input/output data. In addition, the input/output gating circuit 290 may include data latches, storing codewords output from the plurality of bank arrays 310_1 to **310_*n*, and write drivers writing data in the plurality of bank arrays 310_1 to 310_*n***.

In some implementations, during a read operation, a codeword CW read from the selected bank array, among the plurality of bank arrays 310_1 to **310_*n*, may be detected by a sense amplifier corresponding to the selected bank array and stored in the data latches of the input/output gating circuit 290. In addition, the codeword CW stored in the data latches may be ECC-decoded by the ECC engine 350 and provided to the data input/output buffer 320 as data DTA. The data input/output buffer 320 may generate a data signal DQ based on data DTA and provide the generated data signal DQ to the memory controller 100** along with a strobe signal DQS.

In some implementations, during a write operation, the data DTA to be written in the selected bank array among the plurality of bank arrays 310_1 to **310_*n* may be received by the data input/output buffer 320 as the data signal DQ. The data input/output buffer 320 may convert the data signal DQ into data DTA and provide the data DTA to the ECC engine 350. The ECC engine 350 may generate parity bits (or parity data) based on the data DTA and provide the codeword CW including the data DTA and the parity bits to the input/output gating circuit 290. The input/output gating circuit 290** may write the codeword CW in the selected bank array.

In a write operation, the data input/output buffer 320 may convert the data signal DQ into data DTA and provide the data DTA to the ECC engine 350. In a read operation, the data input/output buffer 320 may convert the data DTA, provided by the ECC engine 350, into a data signal DQ.

In a write operation, the ECC engine 350 may perform ECC encoding on the data DTA. In a read operation, the ECC engine 350 may perform ECC decoding on the codeword CW. In addition, the ECC engine 350 may perform ECC encoding and ECC decoding on the count data CNTD provided from the row hammer management circuit 500.

The control logic circuit 210 may control the operation of the memory device 200. For example, the control logic circuit 210 may generate control signals such that the memory device 200 performs a write operation, a read operation, a normal refresh operation, and a hammer refresh operation. The control logic circuit 210 includes a command decoder 211, decoding a command CMD received from the memory controller 100, and a mode register set (MRS) 212 setting the operating mode of the memory device 200.

The command decoder 211 may decode a command CMD to generate internal command signals such as an internal active signal IACT, an internal precharge signal IPRE, an internal read signal IRD, or an internal write signal IWR. In addition, the command decoder 211 may decode a chip select signal and a command/address signal to generate control signals corresponding to the command CMD.

The mode register set 212 may set the operating mode of the memory device 200.

In some implementations, the mode register set 212 may set the operating mode of the memory device 200 to metadata mode. The term "metadata mode" may refer to mode in which both user data and metadata are stored in the memory device 200. The metadata may be data used to improve the performance or security of the memory device.

In some implementations, the mode register set 212 may set the operating mode of the memory device 200 to normal mode. The term "normal mode" may refer to mode in which only user data, excluding metadata, is stored in the memory device 200.

In some implementations, each bank may be defined to include different sub-banks of different bank arrays. In addition, wordlines of one sub-bank included in the same bank and wordlines of another sub-bank form a wordline pair. Accordingly, sub-banks included in the same bank may share a count cell. As a result, the memory device 200 according to some implementations may be implemented in a small area while preventing the row hammer effect.

Figure 4:
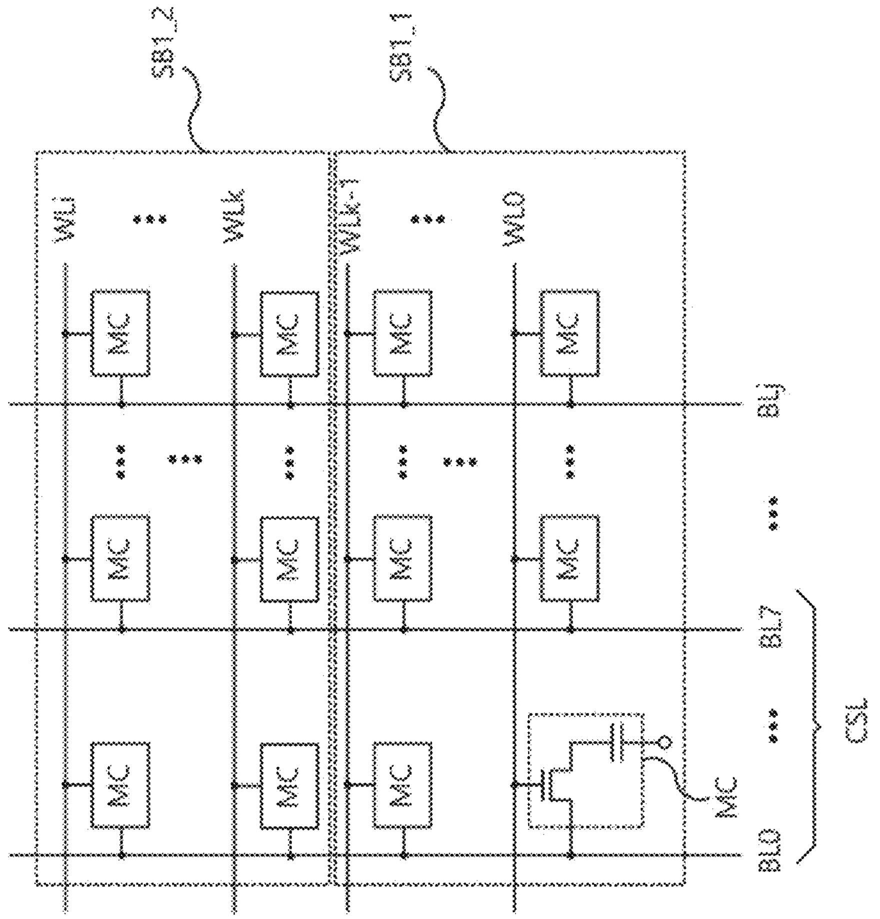
FIG. 4 is a diagram illustrating an example of a bank array according to some implementations.

FIG. 4 is a diagram illustrating an example of a bank array according to some implementations. The bank array 310_1 of FIG. 4 may correspond to, for example, the first bank array 310_1 of FIG. 3. In FIG. 4, for ease of description, an example is provided in which the first bank array 310_1 includes two sub-banks SB1_1 and SB1_2. In addition, an example is provided in which a single column select line CSL corresponds to eight bitlines.

Referring to FIG. 4, the first bank array 310_1 includes a plurality of wordlines WL0 to WLi, a plurality of bitlines BL0 to BLj, and a plurality of memory cells MC disposed at the intersection of the wordlines WL0 to WLi and the bitlines BL0 to BLj.

In some implementations, each memory cell MC may be a DRAM cell. For example, each memory cell MC may include a cell transistor, connected to a wordline and a bitline, and a cell capacitor connected to the cell transistor.

A single column select line CSL may be electrically connected to a plurality of bitlines. For example, the single column select line CSL may be electrically connected to eight bitlines. In some implementations, 8 bits of data may be read from or written in memory cells MCs through a single wordline and a single column select line CSL.

According to some implementations, wordlines extending in a row direction may be referred to as a row of the first bank array 310_1. Column select lines CSLs extending in a column direction may be referred to as a column of the first bank array 310_1. However, this is only an example, and bitlines extending in the column direction may also be referred to as a column of the first bank array 310_1.

In some implementations, the first bank array 310_1 includes a 1_1-th sub-bank SB1_1 and a 1_2-th sub-bank SB1_2. For example, memory cells connected to a 0th wordline WL0 to a k−1-th wordline WLk-1 may constitute a 1_1-th sub-bank SB1_1, and memory cells connected to a kth wordline WLk to an ith wordline WLi may constitute a 1_2-th sub-bank SB1_2. In some implementations, the 1_1-th sub-bank SB1_1 and the 1_2-th sub-bank SB1_2 may correspond to different banks. For example, sub-banks constituting a single bank array may correspond to different banks, respectively.

Figure 5:
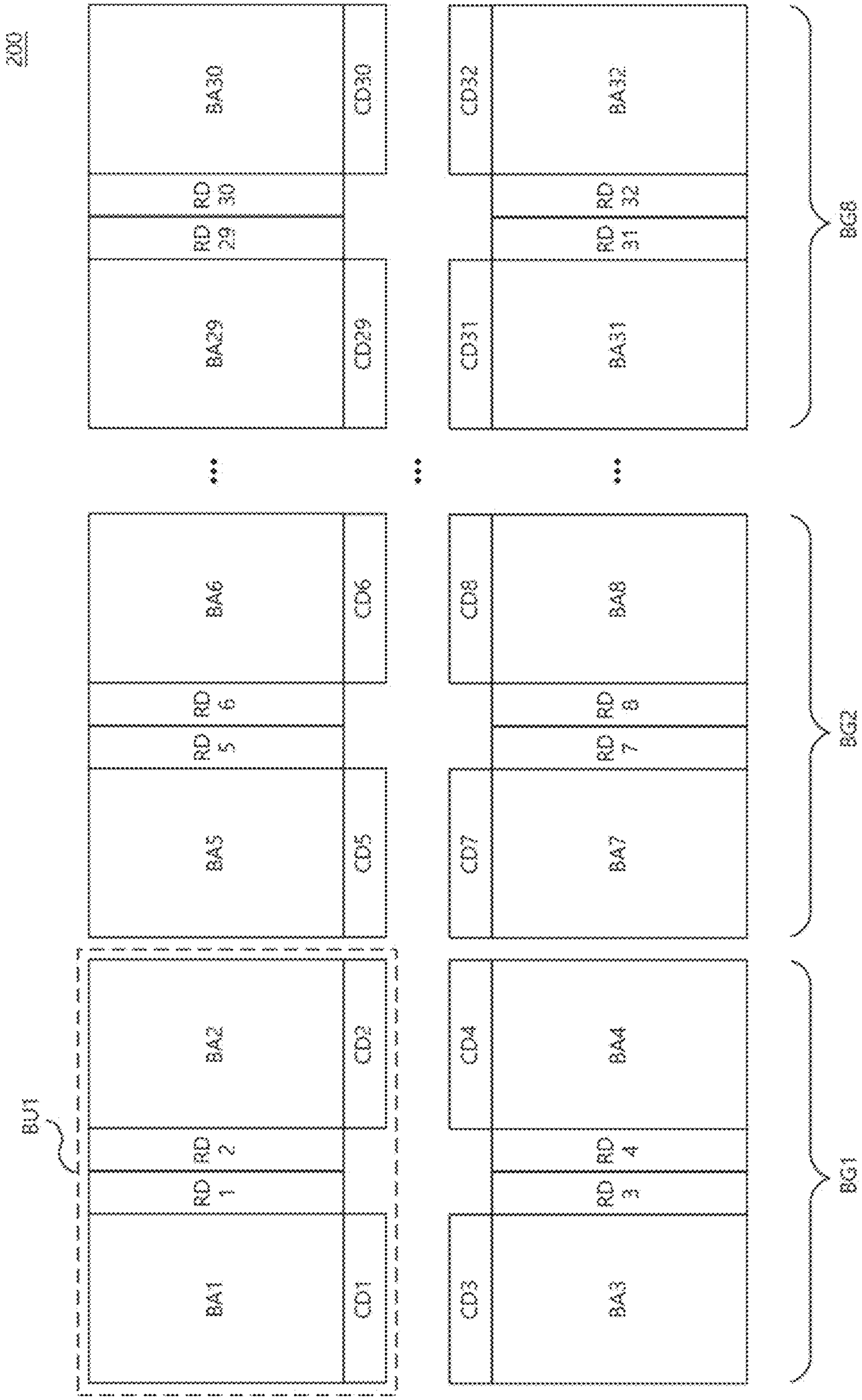
FIG. 5 is a diagram illustrating an example of a memory device according to some implementations.

FIG. 5 is a diagram illustrating an example of a memory device according to some implementations. FIG. 5 illustrates an example of the arrangement of bank arrays and corresponding row decoders and column decoders. The memory device 200 of FIG. 5 may correspond to the memory device 200 of FIGS. 1A, 1B, and 3. For ease of description, an example is provided in which the memory device 200 includes 32 bank arrays and a single bank group BG includes 4 bank arrays.

Referring to FIG. 5, a first bank group BG1 includes first to fourth bank arrays BA1 to BA4. For example, the first and second bank arrays BA1 and BA2 may be disposed adjacent to each other on an upper portion of a substrate, not illustrated, and the third and fourth bank arrays BA3 and BA4 may be disposed adjacent to each other on a lower side of the substrate.

A first row decoder RD1 and a first column decoder CD1 may correspond to the first bank array BA1, and a second row decoder RD2 and a second column decoder CD2 may correspond to the second bank array BA2. In addition, a third row decoder RD3 and a column decoder CD3 may correspond to the third bank array BA3, and a fourth row decoder RD4 and a fourth column decoder CD4 may correspond to the fourth bank array BA4.

Bank arrays, row decoders, and column decoders, disposed to adjacent to each other, may be referred to as a bank unit. For example, the first bank array BA1, the second bank array BA2, the first and second row decoders RD1 and RD2, and the first and second column decoders CD1 and CD2 may be referred to as a first bank unit BU1.

The first and second row decoders RD1 and RD2 may be disposed between adjacent first bank array BA1 and second bank array BA2. In addition, third and fourth row decoders RD3 and RD4 may be disposed between the third bank array BA3 and the fourth bank array BA4 disposed adjacent to each other. However, this is only an example, and the bank array, row decoder, and column decoder may be disposed in various forms according to some implementations.

Similarly, the second bank group BG2 includes fifth to eighth bank arrays BA5 to BA8, and fifth and sixth row decoders RD5 and RD6 may be disposed between the fifth bank array BA5 and the sixth bank array BA6 adjacent to each other, and seventh and eighth row decoders RD7 and RD8 may be disposed between the seventh bank array BA7 and eighth bank array BA8 adjacent to each other. Similarly, an eighth bank group BG8 includes 29th to 32nd bank arrays BA29 to BA32, and row decoders may be placed between bank arrays adjacent to each other.

Figure 6:
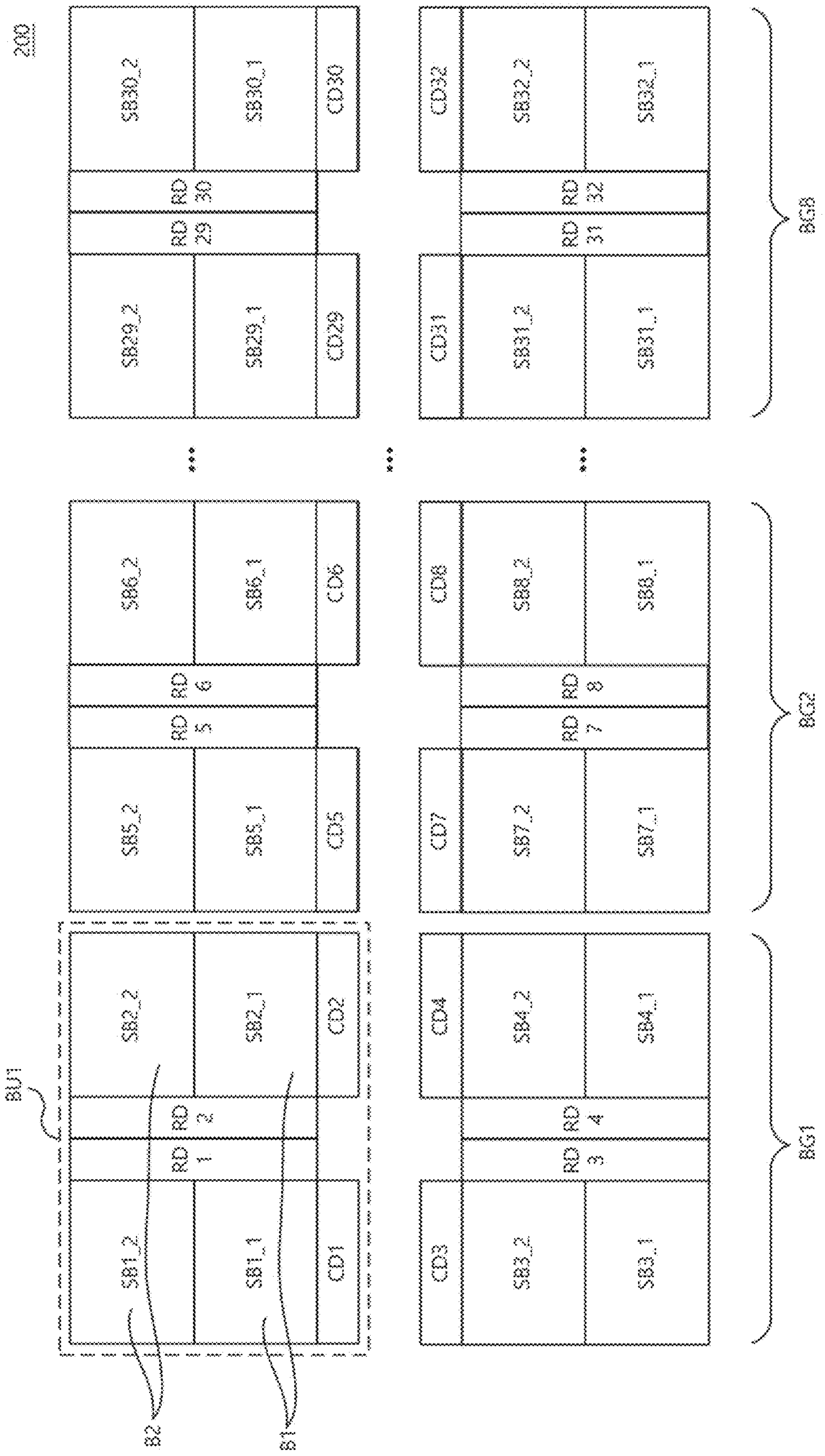
FIG. 6 is a diagram illustrating a bank defined in the memory device of FIG. 5.

FIG. 6 is a diagram illustrating a bank defined in the memory device of FIG. 5. For ease of description, an example is provided in which a single bank array includes two sub-banks.

Referring to FIGS. 5 and 6, each bank array may include two sub-banks. For example, a first bank array BA1 includes a 1_1-th sub-bank SB1_1 and a 1_2-th sub-bank SB1_2, and a second bank array BA2 includes a 2_1-th sub-bank SB2_1 and a 2_2-th sub-bank SB2_2.

A bank may be defined using two sub-banks disposed adjacent to each other in a wordline direction. For example, the first bank B1 may be defined to include the 1_1-th sub-bank SB1_1 and the 2_1-th sub-bank SB2_1, and the second bank B2 may be defined to include the 1_2-th sub-bank SB1_2 and the 2_2-th sub-bank SB2_2.

In some implementations, the two sub-banks included in the single bank may operate independently.

For example, the 1_1-th sub-bank SB1_1 of the first bank B1 may be connected to the first row decoder RD1 and the first column decoder CD1, and may independently perform read and write operations. In addition, the 2_1-th sub-bank SB2_1 of the first bank B1 may be connected to the second row decoder RD2 and the second column decoder CD2, and may independently perform read and write operations.

For example, the 1_2-th sub-bank SB1_2 of the second bank B2 may be connected to the first row decoder RD1 and the first column decoder CD1, and may independently perform read and write operations. In addition, the 2_2-th sub-bank SB2_2 of the second bank B2 may be connected to the second row decoder RD2 and the second column decoder CD2, and may independently perform read and write operations.

As described above, a bank may be defined to include sub-banks adjacent to each other in the wordline direction. Thus, two different read or write operations may be performed independently in a single bank.

Figure 7A:
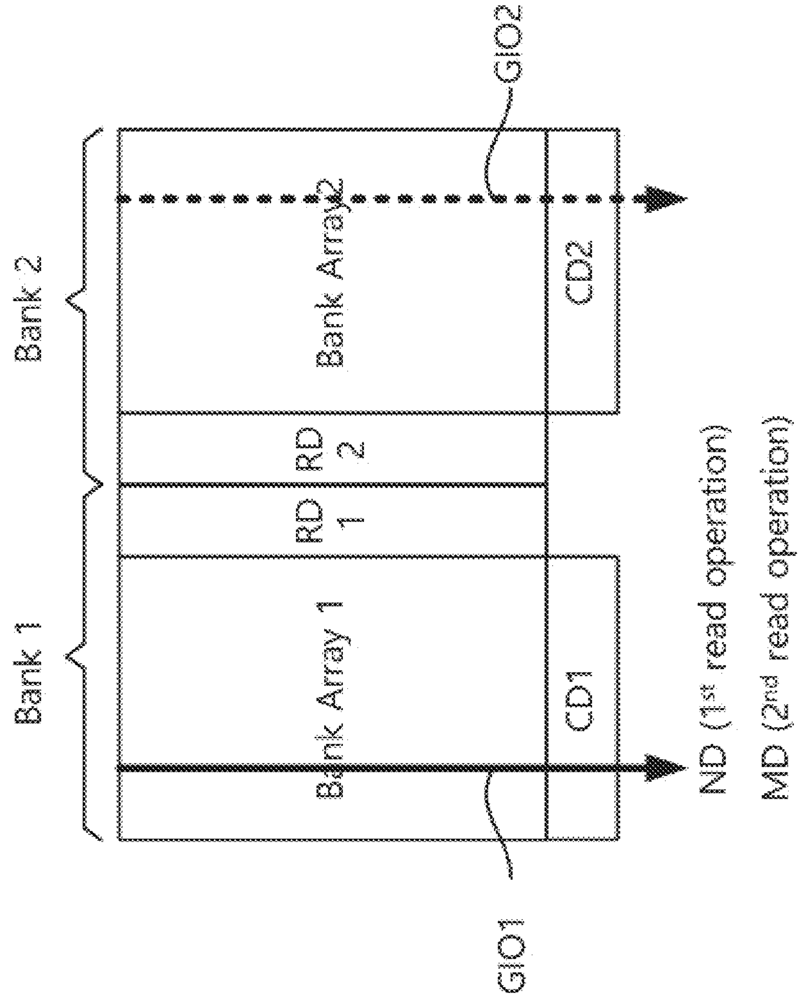
FIGS. 7A to 7C are diagram illustrating an example of an operation of a bank of a memory device according to some implementations.
Figure 7B:
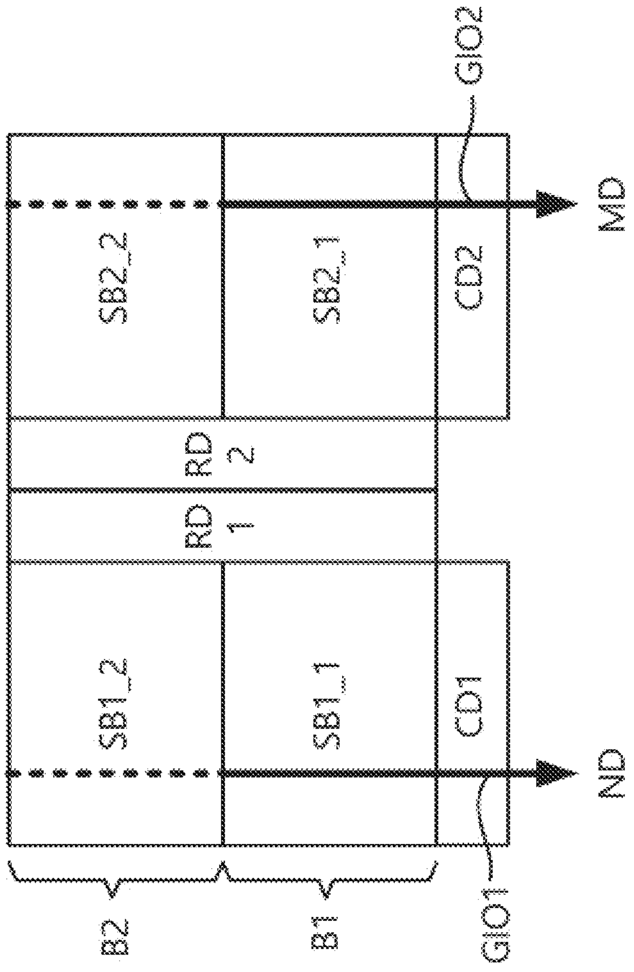
Figure 7C:
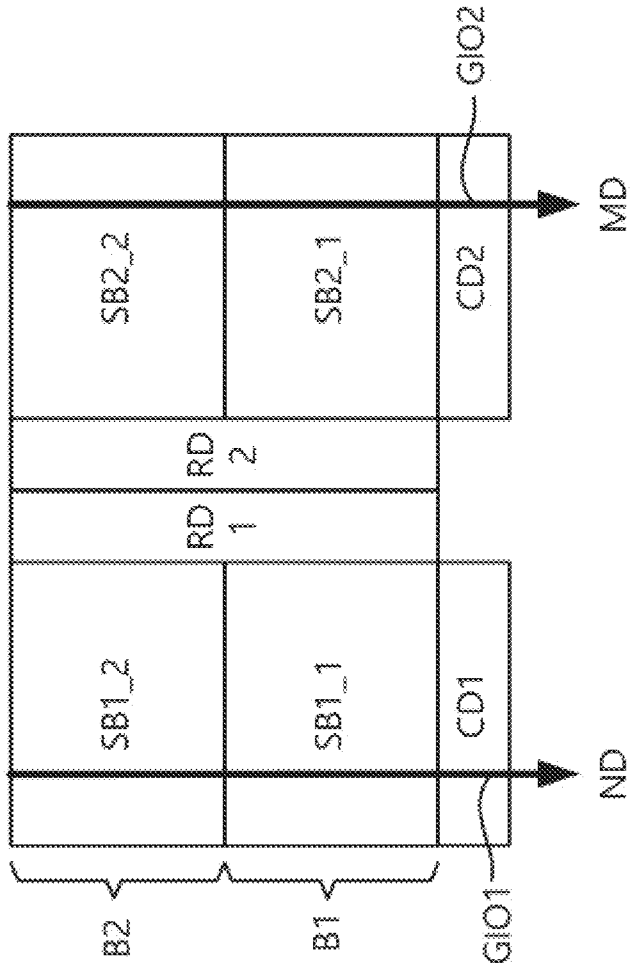

FIGS. 7A to 7C are diagram illustrating an example of an operation of a bank of a memory device according to some implementations. For example, FIG. 7A illustrates an example of a read operation in a general memory device in which a single bank includes a single bank array. FIGS. 7B and 7Cd illustrates an example of a read operation in the memory device 200 of FIG. 6, in which a single bank includes two sub-banks.

Referring to FIG. 7A, in general, a bank is defined to include a single bank array. For example, as illustrated in FIG. 7*a*, a first bank is defined to include a first bank array, a first row decoder, and a first column decoder, and a second bank may be defined to include a second bank array, a second row decoder, and a second column decoder.

When a read operation is performed on normal data ND stored in the first bank array and corresponding metadata MD, a first read operation of reading the normal data ND and a second read operation of reading the metadata MD may be sequentially performed.

In some implementations, both the normal data ND and the metadata MD may be output to the outside through a first global I/O line GIO1. Accordingly, after the first read operation is performed, the first global I/O line GIO1 should be precharged to perform the second read operation. As a result, a large amount of time is required to read the normal data ND and the corresponding metadata MD in a general memory device.

Referring to FIG. 7B, according to some implementations, a first bank B1 may be defined to include a 1_1-th sub-bank SB1_1 and a 2_1-th sub-bank SB2_1. In some implementations, normal data ND may be stored in the 1_1-th sub-bank SB1_1, and metadata MD may be stored in the 2_1-th sub-bank SB2_1.

Since the 1_1-th sub-bank SB1_1 is connected to the first row decoder RD1 and the first column decoder CD1, the read operation on the normal data ND stored in the 1_1-th sub-bank SB1_1 may be independently performed. Also, since the 2_1-th sub-bank SB2_1 is connected to the second row decoder RD2 and the second column decoder CD2, the read operation on the metadata MD stored in the 2_1-th sub-bank SB2_1 may be independently performed.

In addition, since the 1_1-th sub-bank SB1_1 may correspond to the first global I/O line GIO1, and the 2_1-th sub-bank SB2_1 may correspond to the second global I/O line GIO2, the normal data ND and the metadata MD may be output to the outside through the first global I/O line GIO1 and the second global I/O line GIO2, respectively. Accordingly, there is no need to precharge the global I/O line between the read operation on the normal data ND and the read operation on the metadata MD.

As a result, according to some implementations, the normal data ND and the metadata MD stored in the first bank B1 may be simultaneously output.

In some implementations, even when the normal data ND and the metadata MD are stored in the second bank B2, the normal data ND and the metadata MD may be simultaneously output.

For example, as illustrated in FIG. 7C, the normal data ND and the metadata MD may be stored in the 1_2-th sub-bank SB1_2 and the 2_2-th sub-bank SB2_2, respectively. In some implementations, the normal data ND and the metadata MD may be simultaneously output through the first global I/O line GIO1 and the second global I/O line GIO2, respectively.

In FIGS. 7B and 7C, an example of read operations on the normal data ND and the metadata MD has been described. However, it should be understood that this is only an example and implementations are not limited thereto. According to some implementations, even when normal data ND and metadata MD are stored in the first bank B1 or the second bank B2, a write operation on the normal data ND and a write operation on the metadata MD may be simultaneously performed.

Figure 8:
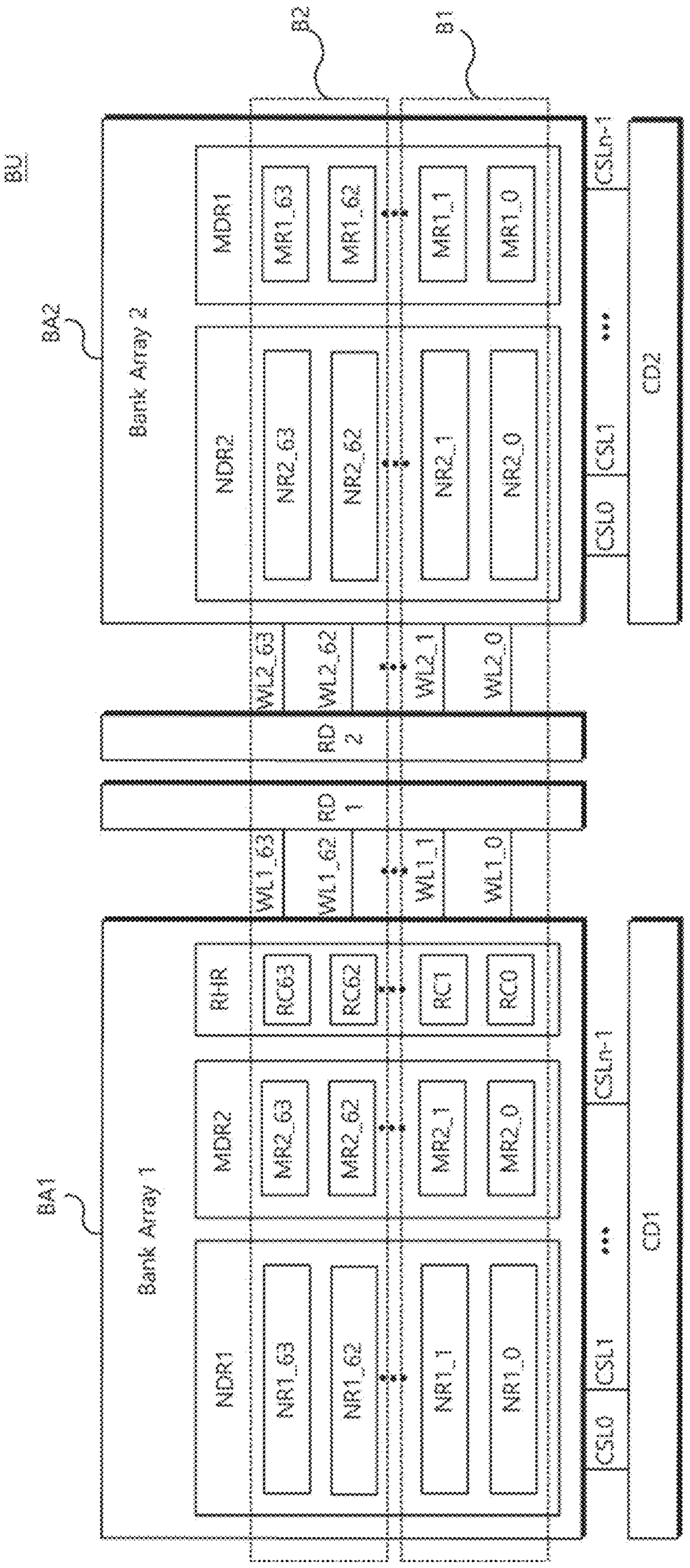
FIG. 8 is a block diagram illustrating an example of a bank unit according to some implementations.

FIG. 8 is a block diagram illustrating an example of a bank unit according to some implementations. A bank unit BU of FIG. 8 may correspond to the bank unit BU of FIGS. 5 and 6. For ease of description, an example is provided in which each bank array corresponds to 64 wordline pairs.

Referring to FIG. 8, the bank unit BU includes first and second bank arrays BA1 and BA2, first and second row decoders RD1 and RD2, and first and second column decoders CD1 and CD2.

The first bank array BA1 may be connected to the first row decoder RD1 through a plurality of wordlines WL1_0 to WL1_63, and may be connected to the first column decoder CD1 through a plurality of column select lines CSL0 to CSLn−1. The first bank array BA1 includes a first normal data region NDR1, a second metadata region MDR2, and a row hammer region RHR.

A first normal data region NDR1 includes a plurality of normal regions NR1_0 to NR1_63 disposed in a column direction. Each of the plurality of normal regions NR1_0 to NR1_63 may store normal data.

In some implementations, each of the plurality of normal regions NR1_0 to NR1_63 may include memory cells, and a single normal region may correspond to a single wordline. However, this is only an example, and a single normal region may correspond to a plurality of wordlines according to some implementations.

The second metadata region MDR2 includes a plurality of meta regions MR2_0 to MR2_63 disposed in a column direction. Each of the plurality of meta regions MR2_0 to MR2_63 may correspond to a plurality of normal regions NR2_0 to NR2_63 of the second bank array BA2, respectively. Each of the plurality of meta regions MR2_0 to MR2_63 may store metadata for corresponding normal data.

In some implementations, each of the plurality of meta regions MR2_0 to MR2_63 may include memory cells, and a single meta region may correspond to a single wordline. However, this is an example, and a single meta region may correspond to a plurality of wordlines according to some implementations.

The row hammer region RHR includes a plurality of row count regions RC0 to RC63 disposed in a column direction. Each of the row count regions RC0 to RC63 may store count data and/or count parity data for a corresponding wordline. The count parity data may be generated based on the count data, and may refer to data used for ECC encoding or decoding of the count data.

In some implementations, each of the plurality of row count regions RC0 to RC63 may include memory cells. A memory cell, storing the count data, may be referred to as a count cell. A memory cell, storing the count parity data, may be referred to as a count parity cell. A single row count region may correspond to a single wordline. However, this is only an example, and a single row count region may correspond to a plurality of wordlines according to some implementations.

Continuing to refer to FIG. 8, the second bank array BA2 may be connected to the second row decoder RD2 through a plurality of wordlines WL2_0 to WL2_63, and may be connected to the second column decoder CD2 through a plurality of column select lines CSL0 to CSLn−1. The second bank array BA2 includes a second normal data region NDR2 and a first metadata region MDR1.

The second normal data region NDR2 includes a plurality of normal regions NR2_0 to NR2_63 disposed in a column direction. Each of the plurality of normal regions NR2_0 to NR2_63 may store normal data.

In some implementations, each of the plurality of normal regions NR2_0 to NR2_63 may include memory cells, and a single normal region may correspond to a single wordline. However, this is only an example, and a single normal region may correspond to a plurality of wordlines according to some implementations.

The first metadata region MDR1 includes a plurality of meta regions MR1_0 to MR1_63 disposed in a column direction. Each of the plurality of meta regions MR1_0 to MR1_63 may correspond to the plurality of normal regions NR1_0 to NR1_63 of the first bank array BA1, respectively. Each of the plurality of meta regions MR1_0 to MR1_63 may store metadata for corresponding normal data.

In some implementations, each of the plurality of meta regions MR1_0 to MR1_63 may include memory cells, and a single meta region may correspond to a single wordline. However, this is only an example, and a single meta region may correspond to a plurality of wordlines according to some implementations.

In some implementations, the first bank B1 may be defined to include a portion of the first bank array BA1 and a portion of the second bank array BA2, and the second bank B2 may be defined to include another portion of the first bank array BA1 and another portion of the second bank array BA2.

For example, the first bank B1 may be defined to include a plurality of normal regions NR1_0 to NR1_31, a plurality of meta regions MR2_0 to MR2_31, and a plurality of row count regions RC0 to RC31 included in the first bank array BA1, and a plurality of normal regions NR2_0 to NR2_31 and a plurality of meta regions MR1_0 to MR1_31 included in the second bank array BA2. The second bank B2 may be defined to include a plurality of normal regions NR1_32 to NR1_63, a plurality of meta regions MR2_32 to MR2_63, and a plurality of row count regions RC32 to RC63 included in the first bank array BA1, and a plurality of normal regions NR2_32 to NR2_63 and a plurality of meta regions MR1_32 to MR1_63 included in the second bank array BA2.

In some implementations, the plurality of wordlines WL1_0 to WL1_63 corresponding to the first bank array BA1 and the plurality of wordlines WL2_0 to WL2_63 corresponding to the second bank array BA2 may constitute a wordline pair.

For example, a 1_0-th wordline WL1_0 of the first bank array BA1 may correspond to a 2_0-th wordline WL2_0 of the second bank array BA2, and the 1_0-th wordline WL1_0 and the 2_0-th wordline WL2_0 may constitute a 0th wordline pair. For example, a 1_1-th wordline WL1_1 of the first bank array BA1 may correspond to a 2_1-th wordline WL2_1 of the second bank array BA2, and the 1_1-th wordline WL1_1 and the 2_1-th wordline WL2_1 may constitute a first wordline pair. Similarly, a 1_63-th wordline WL1_63 of the first bank array BA1 may correspond to a 2_63-th wordline WL2_63 of the second bank array BA2, and the 1_63-th wordline WL1_63 and the 2_63-th wordline WL2_63 may constitute a 63rd wordline pair.

In some implementations, when a read or write operation on normal data and corresponding metadata is requested, two wordlines constituting a wordline pair may be activated.

For example, when a read operation is requested for normal data stored in the 1_0-th normal region NR1_0 and metadata stored in the corresponding 1_0-th meta region MR1_0, the 1_0-th wordline WL1_0 and the 2_0-th wordline WL2_0 may be activated. Then, the normal data stored in the 1_0-th normal region NR1_0 corresponding to the 1_0-th wordline WL1_0 may be output, and the metadata stored in the 1_0-th meta region MR1_0 corresponding to the 2_0-th wordline WL2_0 may be output.

As described above, the two wordlines constituting the wordline pair are activated together. Therefore, the two wordlines constituting the wordline pair may have the same count data. For example, the number of times the 1_0-th wordline WL1_0 is activated and the number of times the 2_0-th wordline WL2_0 is activated are the same, so that the 1_0-th wordline WL1_0 and the 2_0-th wordline WL2_0 may have the same count data.

In some implementations, a plurality of row count regions RC0 to RC63 of the row hammer region RHR may each store count data and/or count parity data for a corresponding wordline pair. For example, the count data for the two wordlines constituting the wordline pair are the same, so that the count data and/or the count parity data for the two wordlines constituting the wordline pair may be integrally managed through the plurality of row count regions RC0 to RC63 of the row hammer region RHR.

As described above, the count data and/or the count parity data for the wordlines constituting the wordline pair may be integrally managed by the row hammer region RHR, so that a space required to implement the row hammer region RHR may be significantly reduced.

Figure 9:
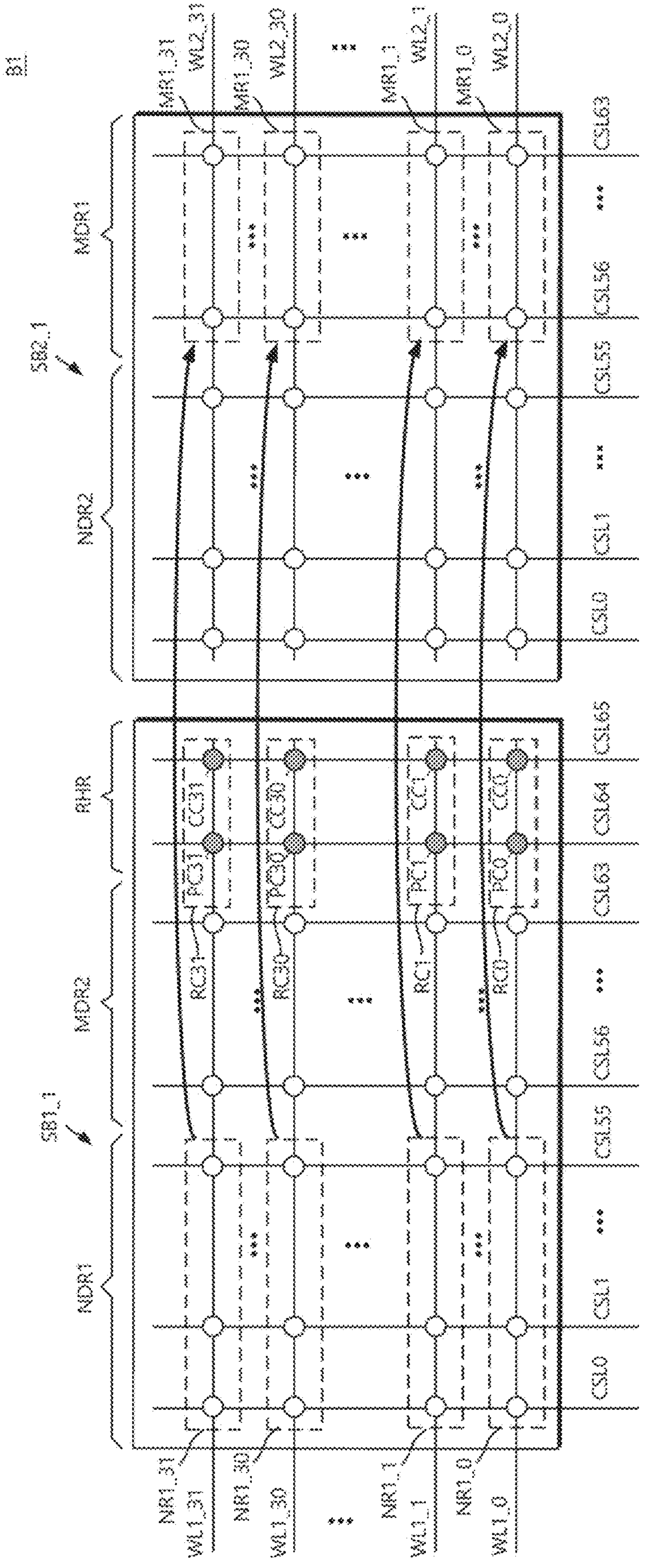
FIGS. 9 to 12 are diagrams illustrating a matching relationship between normal data and metadata in a bank according to some implementations.
Figure 10:
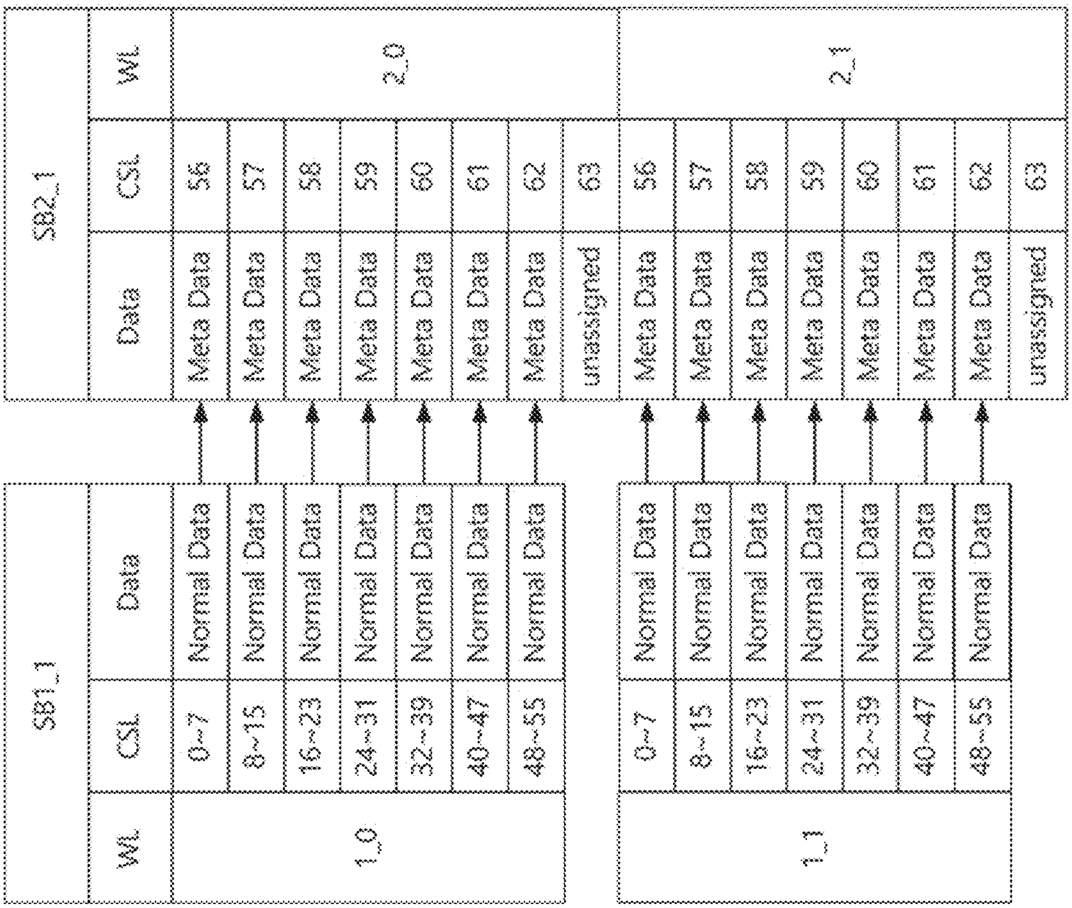
Figure 11:
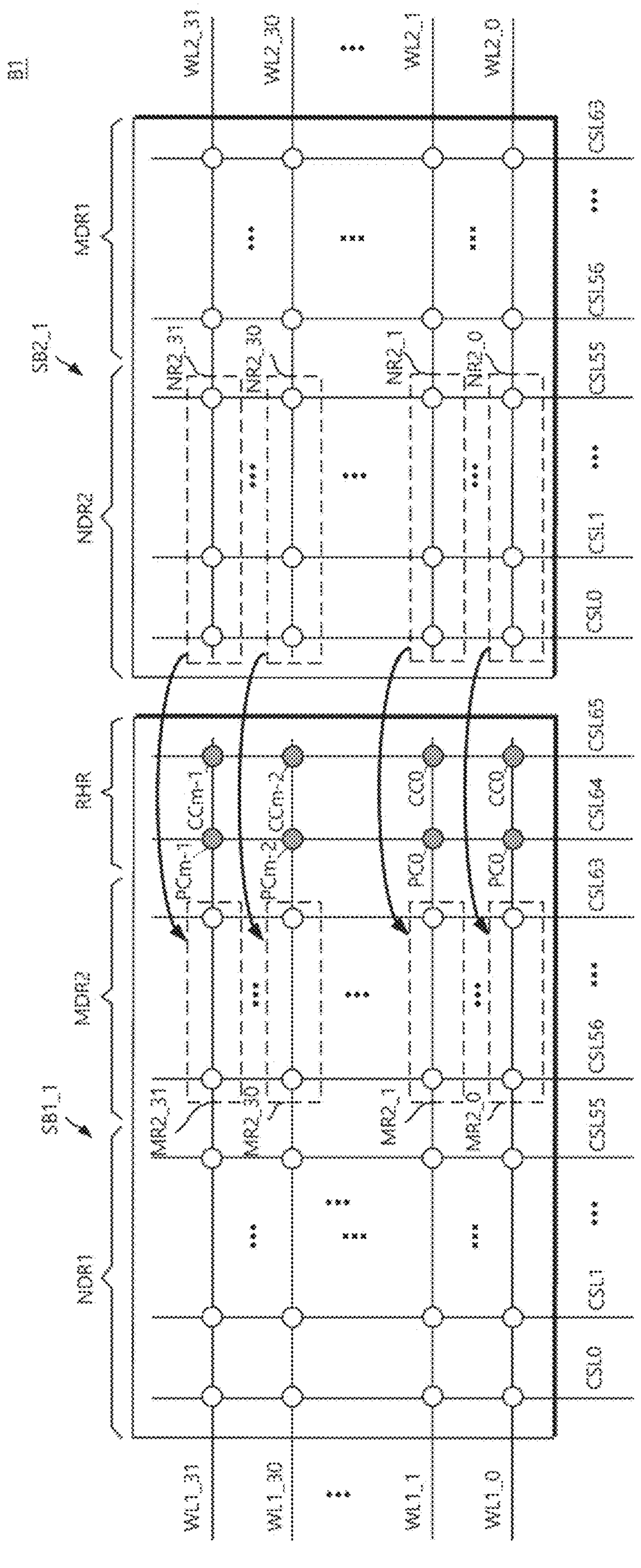
Figure 12:
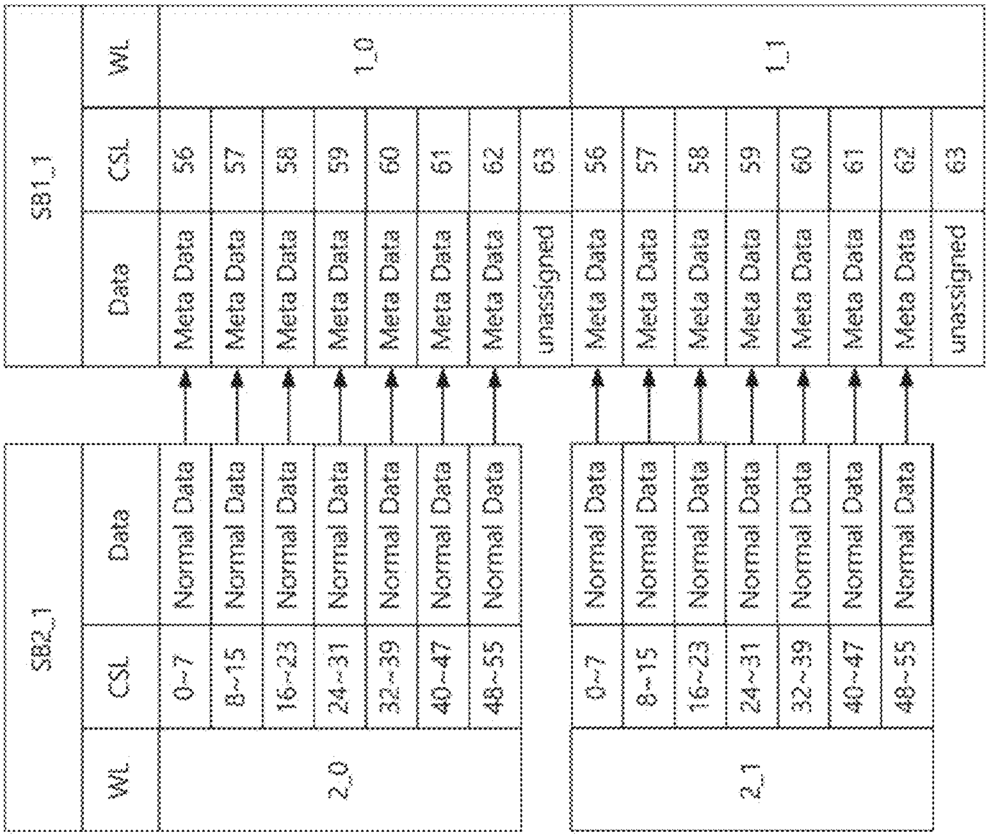

FIGS. 9 to 12 are diagrams illustrating a matching relationship between normal data and metadata in a bank according to some implementations. FIGS. 9 and 10 illustrate an example of a matching relationship between a first normal data region NDR1 and a first metadata region MDR1, FIGS. 11 and 12 illustrate an example of a matching relationship between a second normal data region NDR2 and a second metadata region MDR2. A first bank B1 of FIGS. 9 to 12 may correspond to, for example, the first bank B1 of FIG. 8.

For ease of description, an example is provided in which normal data and metadata match at a ratio of 8:1, each normal data region corresponds to 56 column select lines, and each metadata region corresponds to 8 column select lines. Also, for ease of description, an example is provided in which the first bank B1 corresponds to 32 wordline pairs.

Referring to FIGS. 9 and 10, the first bank B1 includes a 1_1-th sub-bank SB1_1 and a 2_1-th sub-bank SB2_1. The 1_1-th sub-bank SB1_1 includes a first normal data region NDR1, a second metadata region MDR2, and a row hammer region RHR. The 2_1-th sub-bank SB2_1 includes a second normal data region NDR2 and a first metadata region MDR1.

The first normal data region NDR1 of the 1_1-th sub-bank SB1_1 may match the first metadata region MDR1 of the 2_1-th sub-bank SB2_1. A plurality of wordlines WL1_0 to WL1_31 corresponding to the 1_1-th sub-bank SB1_1 may constitute a wordline pair with a plurality of wordlines WL2_0 to WL2_31 corresponding to the 2_1-th sub-bank SB2_1. Accordingly, a plurality of normal regions NR1_0 to NR1_31 connected to the plurality of wordlines WL1_0 to WL1_31 may each match to a plurality of meta regions MR1_0 to MR1_31 connected to the plurality of wordlines WL2_0 to WL2_31.

For example, the 1_0-th normal region NR1_0 may correspond to the 1_0-th wordline WL1_0 and 0th to 55th column select lines CSL0 to CSL55 of the 1_1-th sub-bank SB1_1. The 1_0-th meta region MR1_0 may correspond to the 2_0-th wordline WL2_0 and 56th to 63rd column select lines CSL56 to CSL63 of the 2_1-th sub-bank SB2_1.

Memory cells corresponding to the 1_0-th wordline WL1_0 and the 0th to 7th column select lines CSL0 to CSL7 of the 1_0-th normal region NR1_0 may store normal data, and metadata corresponding to the normal data may be stored in memory cells corresponding to the 2_0-th wordline WL2_0 and the 56th column select line CSL56 of the 1_0-th meta region MR1_0.

Memory cells corresponding to the 1_0-th wordline WL1_0 and the 8th to 15th column select lines CSL8 to CSL15 of the 1_0-th normal region NR1_0 may store normal data, and metadata corresponding to the normal data may be stored in memory cells corresponding to the 2_0-th wordline WL2_0 and the 57th column select line CSL57 of the 1_0-th meta region MR1_0.

Similarly, memory cells corresponding to the 1_0-th wordline WL1_0 and the 48th to 55th column select lines CSL48 to CSL55 of the 1_0-th normal region NR1_0 may store normal data, and metadata corresponding to the normal data may be stored in the memory cells corresponding to the 2_0-th wordline WL2_0 and the 62nd column select line CSL62 of the 1_0-th meta region MR1_0.

Since the normal data and the metadata match each other at a ratio of 8:1, data may not be stored in the memory cells corresponding to the 2_0-th wordline WL2_0 and the 63rd column select line CSL63.

Similarly, the 1_1-th normal region NR1_1 may correspond to the 1_1-th wordline WL1_1 and the 0th to 55th column select lines CSL0 to CSL55, and the 1_1-th meta region MR1_1 may correspond to the 2_1-th wordline WL2_1 and the 56th to 63rd column select lines CSL56 to CSL63. The normal data stored in the 1_1-th normal region NR1_1 and the metadata stored in the 1_1-th meta region MR1_1 may match each other. Similarly, the 1_31-th normal region NR1_31 may correspond to the 1_31-th wordline WL1_31 and the 0th to 55th column select lines CSL0 to CSL55, and the 1_31-th meta region MR1_31 may corresponds to the second_31 wordline WL2_31 and the 56th to 63rd column select lines CSL56 to CSL63. The normal data stored in the 1_31-th normal region NR1_31 and the metadata stored in the 1_31-th meta region MR1_31 may match each other.

Referring to FIGS. 11 and 12, the second normal data region NDR2 of the 2_1-th sub-bank SB2_1 may match the second metadata region MDR2 of the 1_1-th sub-bank SB1_1. A plurality of normal regions NR2_0 to NR2_31 connected to a plurality of wordlines WL2_0 to WL2_31 may match a plurality of meta regions MR2_0 to MR2_31 connected to a plurality of wordlines WL1_0 to WL1_31, respectively.

For example, the 2_0-th normal region NR2_0 may correspond to the 2_0-th wordline WL2_0 and column select lines CSL0 to CSL55 of a 2_1-th sub-bank SB2_1. The 2_0-th meta region MR2_0 may correspond to the 1_0-th wordline WL1_0 and the column select lines CSL56 to CSL63.

Memory cells corresponding to the 2_0-th wordline WL2_0 and the column select lines CSL0 to CSL7 of the 2_0-th normal region NR2_0 may store normal data, and metadata corresponding to the above normal data may be stored in the memory cells corresponding to the 1_0-th wordline WL1_0 and the 56th column select line CSL56 of the 2_0-th meta region MR2_0.

Memory cells corresponding to the 2_0-th wordline WL2_0 and the column select lines CSL8 to CSL15 of the 2_0-th normal region NR2_0 may store normal data, and metadata corresponding to the above normal data may be stored in the memory cells corresponding to the 1_0-th wordline WL1_0 and the 57th column select line CSL57 of the 2_0-th meta region MR2_0.

Similarly, memory cells corresponding to the 2_0-th wordline WL2_0 and the column select lines CSL48 to CSL55 of the 2_0-th normal region NR2_0 may store normal data, and metadata corresponding to the above normal data may be stored in the memory cells corresponding to the 1_0-th wordline WL1_0 and the 62nd column select line CSL62 of the 2_0-th meta region MR2_0.

Since the normal data and the metadata match each other at a ratio of 8:1, data may not be store in the memory cells corresponding to the 1_0-th wordline WL1_0 and the 63rd column select line CSL63.

Similarly, the 2_1-th normal region NR2_1 may correspond to the 2_1-th wordline WL2_1 and the column select lines CSL0 to CSL55, and the 2_1-th meta region MR2_1 may correspond to the 1_1-th wordline WL1_1 and the column select lines CSL56 to CSL63. The normal data stored in the 2_1-th normal region NR2_1 and the metadata stored in the 2_1-th meta region MR2_1 may match each other. Similarly, the 2_31-th normal region NR2_31 may correspond to the 2_31-th wordline WL2_31 and the column select lines CSL0 to CSL55, and the 2_31-th meta region MR2_31 may correspond to the 1_31-th wordline WL1_31 and the column select lines CSL56 to CSL63. The normal data stored in the 2_31-th normal region NR2_31 and the metadata stored in the 2_31-th meta region MR2_31 may match each other.

As described in FIGS. 9 to 12, the plurality of wordlines WL1_0 to WL1_31 corresponding to the 1_1-th sub-bank SB1_1 and the plurality of wordlines WL2_0 to WL2_31 corresponding to the 2_1-th sub-bank SB2_1 may match at a ratio of 1:1 to form wordline pairs. In some implementations, normal data may be stored in memory cells connected to one of two wordlines forming a wordline pair, and metadata corresponding to the normal data may be stored in memory cells connected to the other wordline. Accordingly, when the normal data and the corresponding metadata are input or output, both of the two wordlines forming the wordline pair may be activated.

Returning to FIGS. 9 and 11, the row hammer region RHR includes a plurality of row count regions RC0 to RC31, and the plurality of row count regions RC0 to RC31 may correspond to a plurality of wordline pairs, respectively. For example, the 0th row count region RC0 may correspond to the 0th wordline pair including the 1_0-th wordline WL1_0 and the 2_0-th wordline WL2_0, and the first row count region RC1 may correspond to the first wordline pair including the 1_1-th wordline WL1_1 and the 2_1-th wordline WL2_1.

Each row count region may include a count cell and a count parity cell. For example, the 0th row count region RC0 includes a 0th count cell CC0 and a 0th count parity cell PC0, and the first row count region RC1 includes a first count cell CC1 and a first count parity cell PC1.

The count cell may store count data for the corresponding wordline pair. The count parity cell may store count parity data used for ECC encoding or decoding operations. For example, the 0th count cell CC0 of the 0th row count region RC0 may store count data corresponding to the 1_0-th wordline WL1_0 and the 2_0-th wordline WL2_0 forming a 0th wordline pair, and the 0th count parity cell PC0 may store count parity data corresponding to the 1_0-th wordline WL1_0 and the 2_0-th wordline WL2_0 forming a 0th wordline pair. For example, the first count cell CC1 of the first row count region RC1 may store count data corresponding to the 1_1-th wordline WL1_1 and the 2_1-th wordline WL2_1 forming a first wordline pair, and the first count parity cell PC1 stores count parity data corresponding to the 1_1-th wordline WL1_1 and the 2_1-th wordline WL2_1 forming a first wordline pair.

In some implementations, the 1_1-th sub-bank SB1_1 and the 2_1-th sub-bank SB2_1 may share the count data stored in the count cells and the count parity data stored in the count parity cells.

For example, as described above, the plurality of wordlines WL1_0 to WL1_31 of the 1_1-th sub-bank SB1_1 and the plurality of wordlines WL2_0 to WL2_31 of the 2_1-th sub-bank SB2_1 may form wordline pairs, and two wordlines included in each of the wordline pairs may be activated together. Accordingly, a number of accesses to the plurality of wordlines WL1_0 to WL1_31 of the 1_1-th sub-bank SB1_1 and a number of accesses to the plurality of wordlines WL2_0 to WL2_31 of the 2_1-th sub-bank SB2_1 may be the same. Accordingly, the 1_1-th sub-bank SB1_1 and the 2_1-th sub-bank SB2_1 each do not need to have the same count data and count parity data, and may share the count data and count parity data. As a result, an area occupied by the row hammer region required to prevent the row hammer effect may be significantly reduced.

Figure 13:
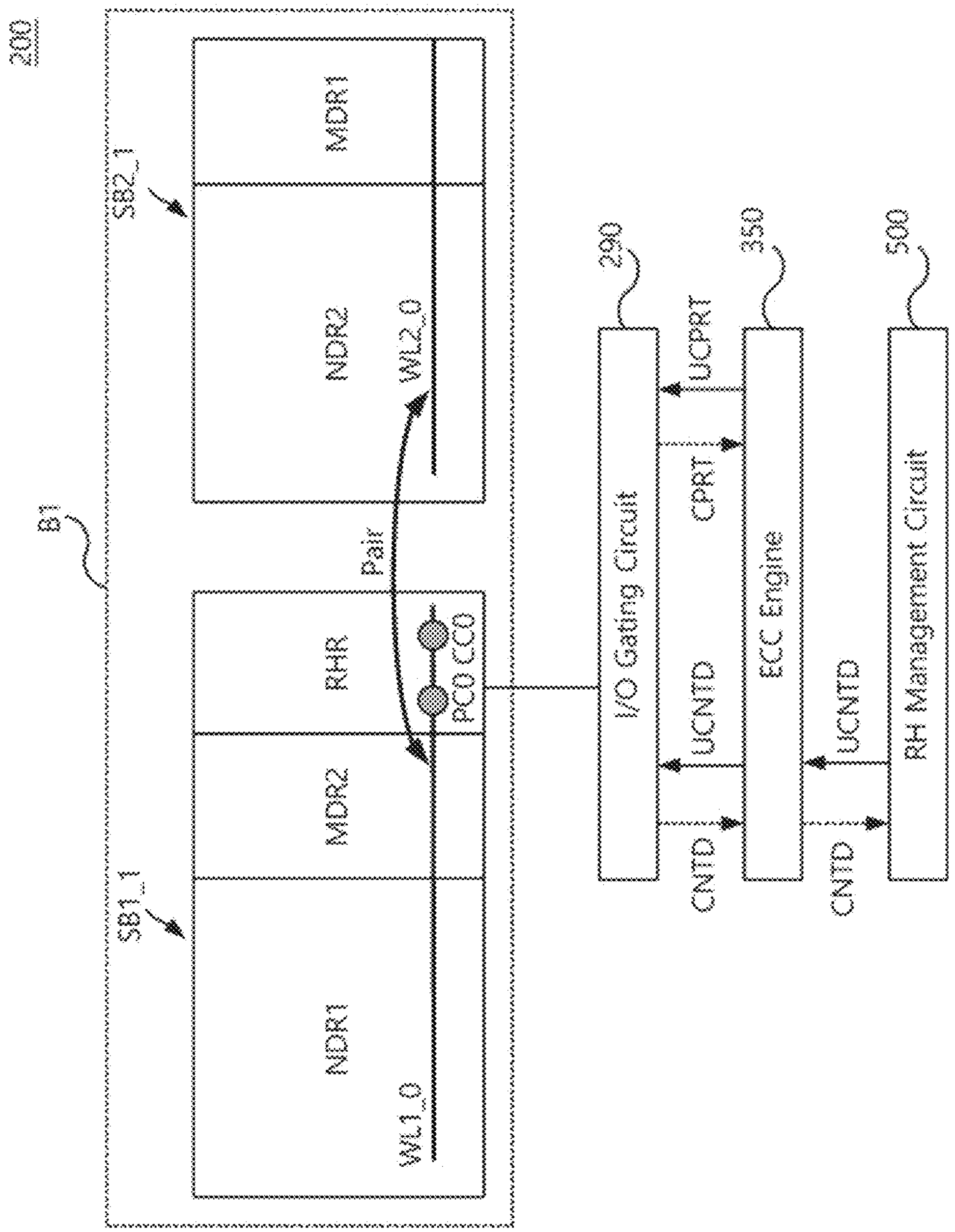
FIG. 13 is a diagram illustrating an example of a memory device according to some implementations that update count data through a read-modify-write (RMW) operation.

FIG. 13 is a diagram illustrating an example of a memory device according to some implementations that update count data through an RMW operation. For ease of description, an example is provided in which the row hammer region RHR is included in a 1_1-th sub-bank SB1_1, similarly to FIGS. 8 to 12.

Referring to FIG. 13, a request for access to a target wordline pair may be received. For example, a request for access to normal data corresponding to a 1_0-th wordline WL1_0 of a first normal data region NDR1 may be received. In some implementations, the 1_0-th wordline WL1_0 and a 2_0-th wordline WL2_0 may be activated to read normal data and metadata corresponding to the normal data. Alternatively, a request for access to normal data corresponding to the 2_0-th wordline WL2_0 of a second normal data region NDR2 may be received. In some implementations, the 1_0-th wordline WL1_0 and the 2_0-th wordline WL2_0 may be activated to read normal data and metadata corresponding to the normal data.

Then, a read operation in the RMW operation may be performed.

For example, count data CNTD on the 1_0-th wordline WL1_0 and the 2_0-th wordline WL2_0 may be read from a 0th count cell CC0, and the read count data CNTD may be provided to the ECC engine 350 through the input/output gating circuit 290. In addition, count parity data CPRT corresponding to the count data CNTD may be read from a 0th count parity cell PC0, and the read count parity data CPRT may be provided to the ECC engine 350 through the input/output gating circuit 290.

The ECC engine 350 may perform ECC decoding on the count data CNTD and the count parity data CPRT to correct an error bit of the count data CNTD, and may provide the count data CNTD to the row hammer management circuit 500.

Then, a correction operation in the RMW operation may be performed.

For example, the row hammer management circuit 500 may perform an update operation to increase the count data CNTD by '1.'

Then, a write operation in the RMW operation may be performed.

For example, the row hammer management circuit 500 may provide the updated count data UCNTD to the ECC engine 350. The ECC engine 350 may perform ECC encoding on the updated count data UCNTD to generate updated count parity data UCPRT. The updated count data UCNTD may be re-stored in the 0th count cell CC0. In addition, the updated count parity data UCPRT may be re-stored in the 0th count parity cell PC0.

In some implementations, the updated count data UCNTD and the updated count parity data UCPRT may correspond to a target wordline pair, the 1_0-th wordline WL1_0, and the 2_0-th wordline WL2_0. For example, the updated count data UCNTD and the updated count parity data UCPRT may be shared by the 1_1-th sub-bank SB1_1 and the 2_1-th sub-bank SB2_1, and therefore the 2_1-th sub-bank SB2_1 does not need to have a separate row hammer region RHR. As a result, the sub-banks SB1_1 and SB2_1 included in the same first bank B1 may share the count data and count parity data with each other to significantly reduce an area required to implement the row hammer region RHR.

In FIGS. 8 to 13, the row hammer region RHR has been described as being provided in a single sub-bank. However, it should be understood that this is only an example, and implementations are not limited thereto. For example, as will be described below with reference to FIG. 14 and, the row hammer region RHR may be distributed and provided in two sub-banks included in the same bank.

Figure 14:
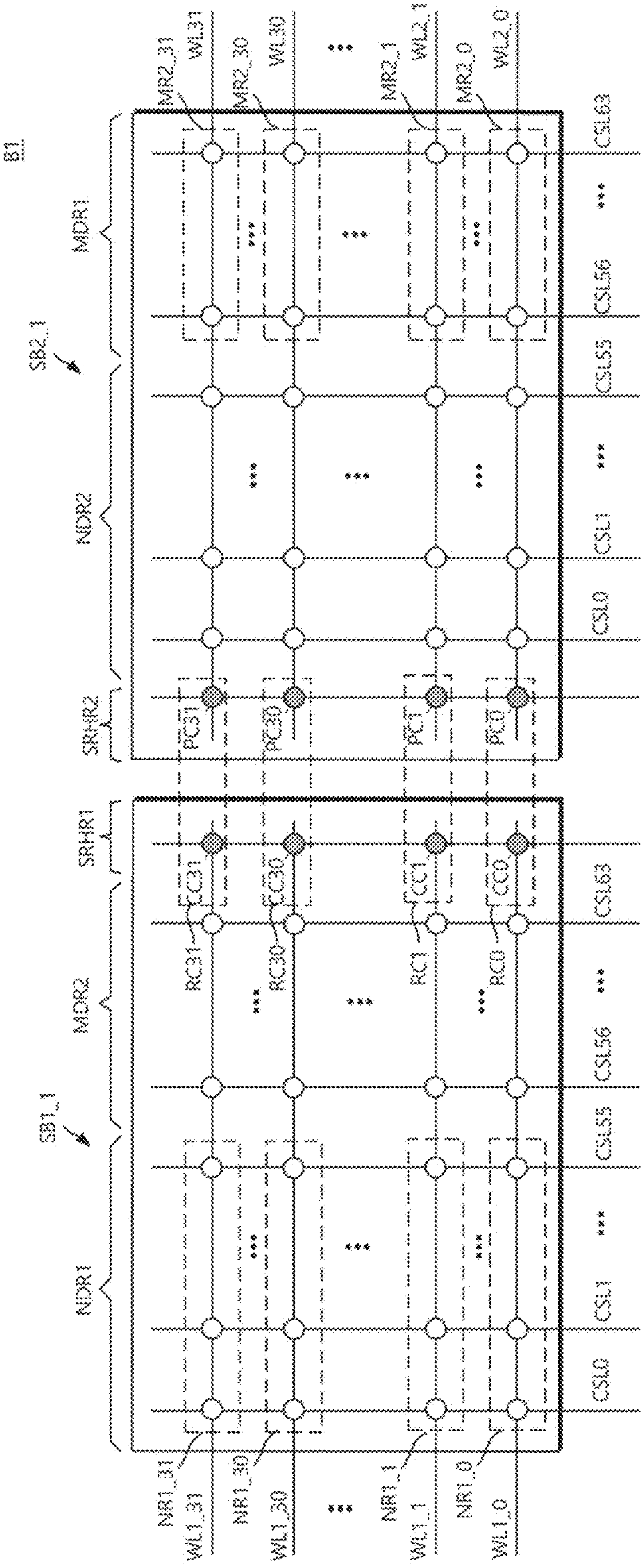
FIG. 14 is a diagram illustrating some implementations in which a row hammer region is implemented in a distributed manner.
Figure 15:
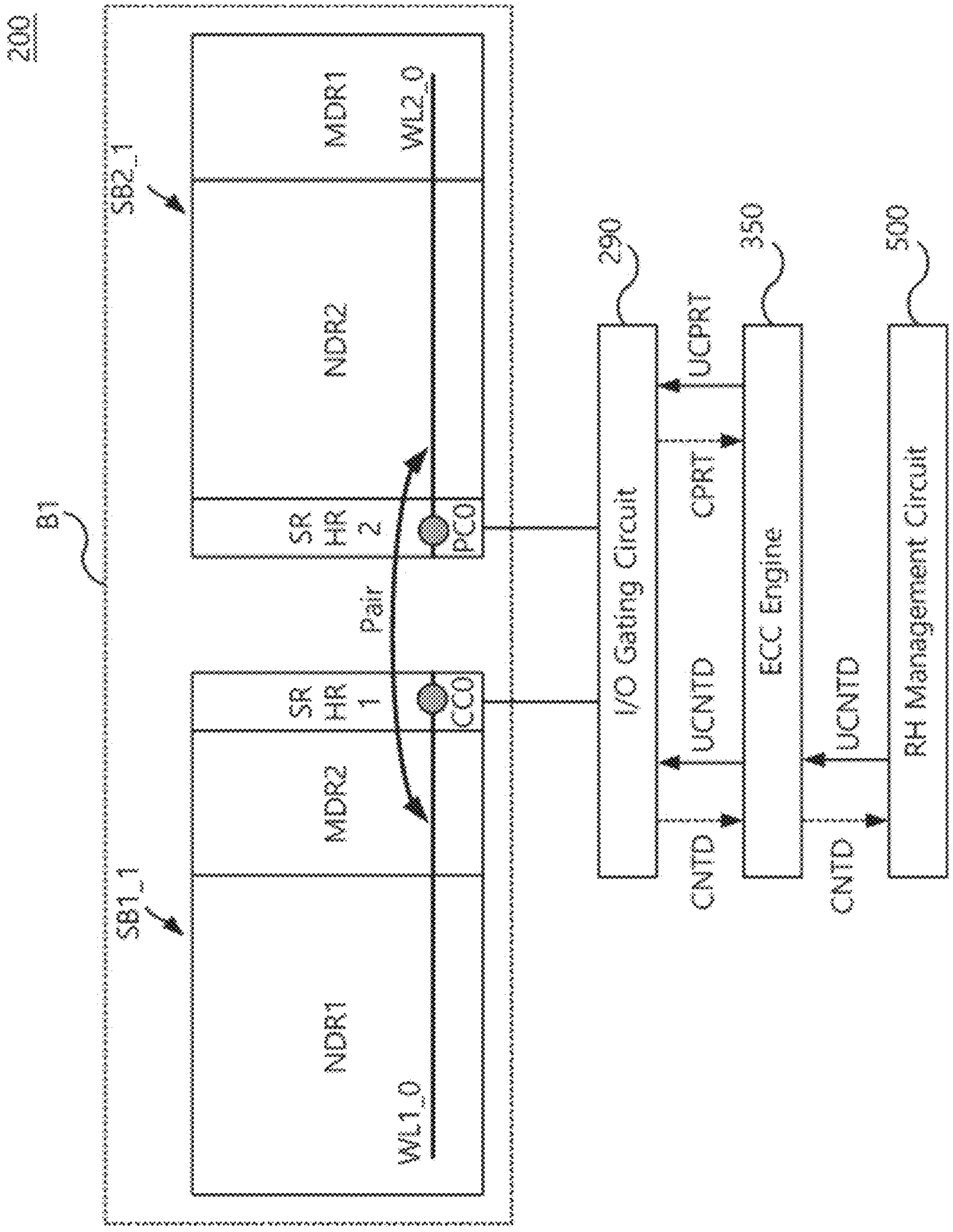
FIG. 15 is a diagram illustrating an example of an RMW operation performed when the row hammer area is implemented in a distributed manner.

FIG. 14 is a diagram illustrating some implementations in which a row hammer region is implemented in a distributed manner, and FIG. 15 is a diagram showing an example of an RMW operation performed when the row hammer area is implemented in a distributed manner. A first bank B1 of FIG. 14 is similar to that of FIG. 9, and a memory device 200 of FIG. 15 is similar to that of FIG. 13. Therefore, the same or similar components will be denoted by the same or similar reference numerals, and duplicate descriptions will be omitted below.

Referring to FIG. 14, a first bank B1 includes a 1_1-th sub-bank SB1_1 and a 2_1-th sub-bank SB2_1. The 1_1-th sub-bank SB1_1 includes a first normal data region NDR1, a second metadata region MDR2, and a first sub row hammer region SRHR1. The 2_1-th sub-bank SB2_1 includes a second normal data region NDR2, a first metadata region MDR1, and a second sub row hammer region SRHR2.

The first sub row hammer region SRHR1 and the second sub row hammer region SRHR2 may correspond to the row hammer region RHR of FIG. 9. For example, each of the plurality of row count regions RC0 to RC31 included in the row hammer region RHR of FIG. 9 may be divided into the first sub row hammer region SRHR1 and the second sub row hammer region SRHR2.

For example, the first sub row hammer region SRHR1 may be implemented to include a plurality of count cells CC0 to CC31, and the second sub row hammer region SRHR2 may be implemented to include a plurality of count parity cells PC0 to PC31. Each of the plurality of count cells CC0 to CC31 may store count data for a corresponding wordline pair. Each of the plurality of count parity cells PC0 to PC31 may store count parity data for corresponding count data.

Referring to FIG. 15, a request for access to a target wordline pair may be received. For example, the target wordline pair may be a 1_0-th wordline WL1_0 and a 2_0-th wordline WL2_0. In some implementations, the 1_0-th wordline WL1_0 and the 2_0-th wordline WL2_0 may be activated.

Then, a read operation in the RMW operation may be performed.

For example, the count data CNTD on the 1_0-th wordline WL1_0 and the 2_0-th wordline WL2_0 may be read from the 0th count cell CC0 of the first sub row hammer region SRHR1, and the read count data CNTD may be provided to an ECC engine 350 through an input/output gating circuit 290. In addition, count parity data CPRT corresponding to the count data CNTD may be read from the 0th count parity cell PC0 of the second sub row hammer region SRHR2, and the read count parity data CPRT may be provided to the ECC engine 350 through the input/output gating circuit 290.

The ECC engine 350 may perform ECC decoding on the count data CNTD and the count parity data CPRT to correct an error bit of the count data CNTD, and may provide the count data CNTD to the row hammer management circuit 500.

Then, a correction operation in the RMW operation may be performed.

For example, the row hammer management circuit 500 may perform an update operation to increase the count data CNTD by '1.'

Then, a write operation in the RMW operation may be performed.

For example, the row hammer management circuit 500 may provide the updated count data UCNTD to the ECC engine 350. The ECC engine 350 may perform ECC encoding on the updated count data UCNTD to generate updated count parity data UCPRT. The updated count data UCNTD may be re-stored in the 0th count cell CC0. In addition, the updated count parity data UCPRT may be re-stored in the 0th count parity cell PC0.

As described above the count cells and parity count cells may be implemented to be distributed in the 1_1-th sub-bank SB1_1 and the 2_1-th sub-bank SB2_1.

In FIGS. 8 to 15, the ratio of the count data and the parity count data corresponding to the same wordline pair has been described as being 1:1. However, it will be understood that this is only an example and implementations are not limited thereto. According to some implementations, the ratio of the count data and the parity count data may be set to N:1 (where N is a positive integer). According to some implementations, the ECC engine may not be provided. In some implementations, the parity count cells may not be provided.

In FIGS. 9 to 15, the ratio of the normal data and the metadata has been described as being 8:1. However, it will be understood that this is only an example and implementations are not limited thereto. According to some implementations, the ratio of the normal data and the meta count data may be set to N:1 (where N is a positive integer). For example, the ratio of the normal data to the meta count data may be set to 16:1.

Figure 16:
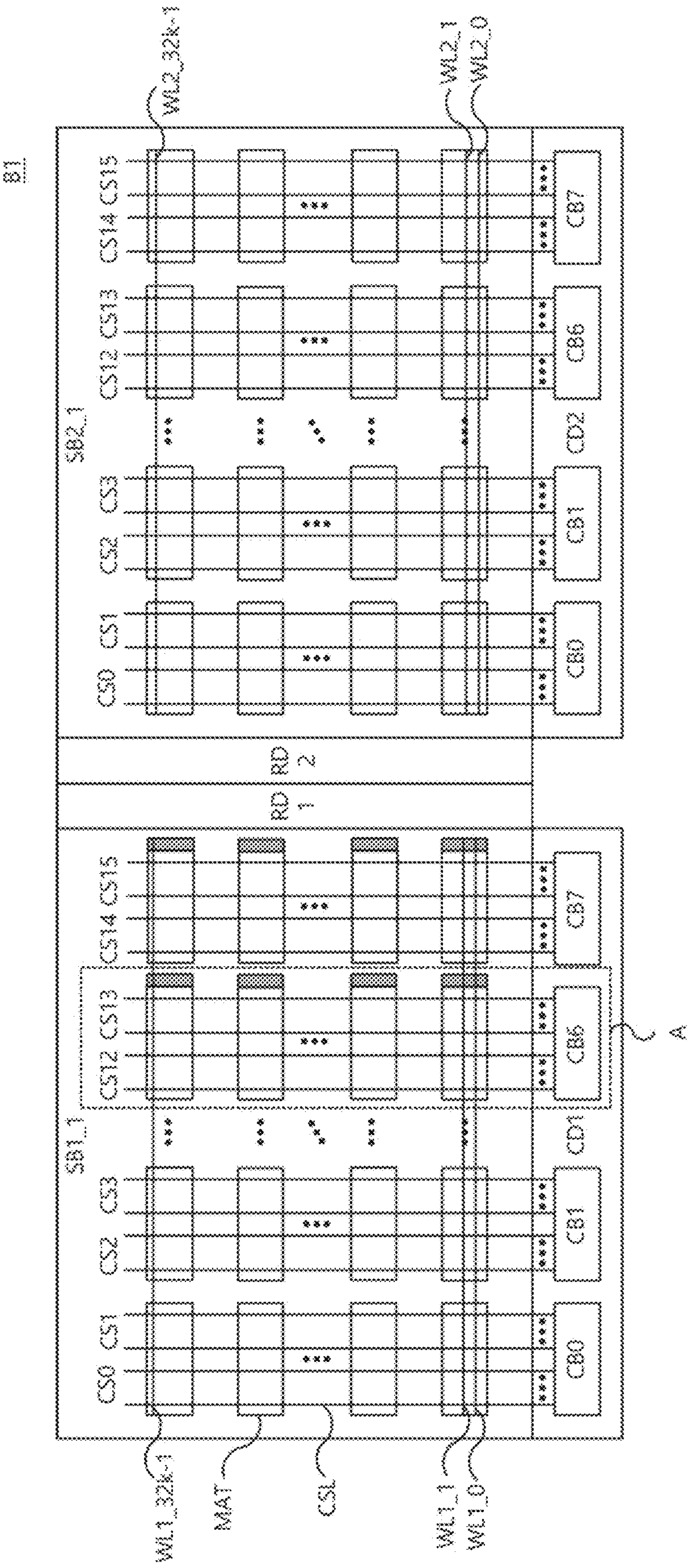
FIG. 16 is a diagram illustrating an example of a bank according to some implementations.
Figure 17:
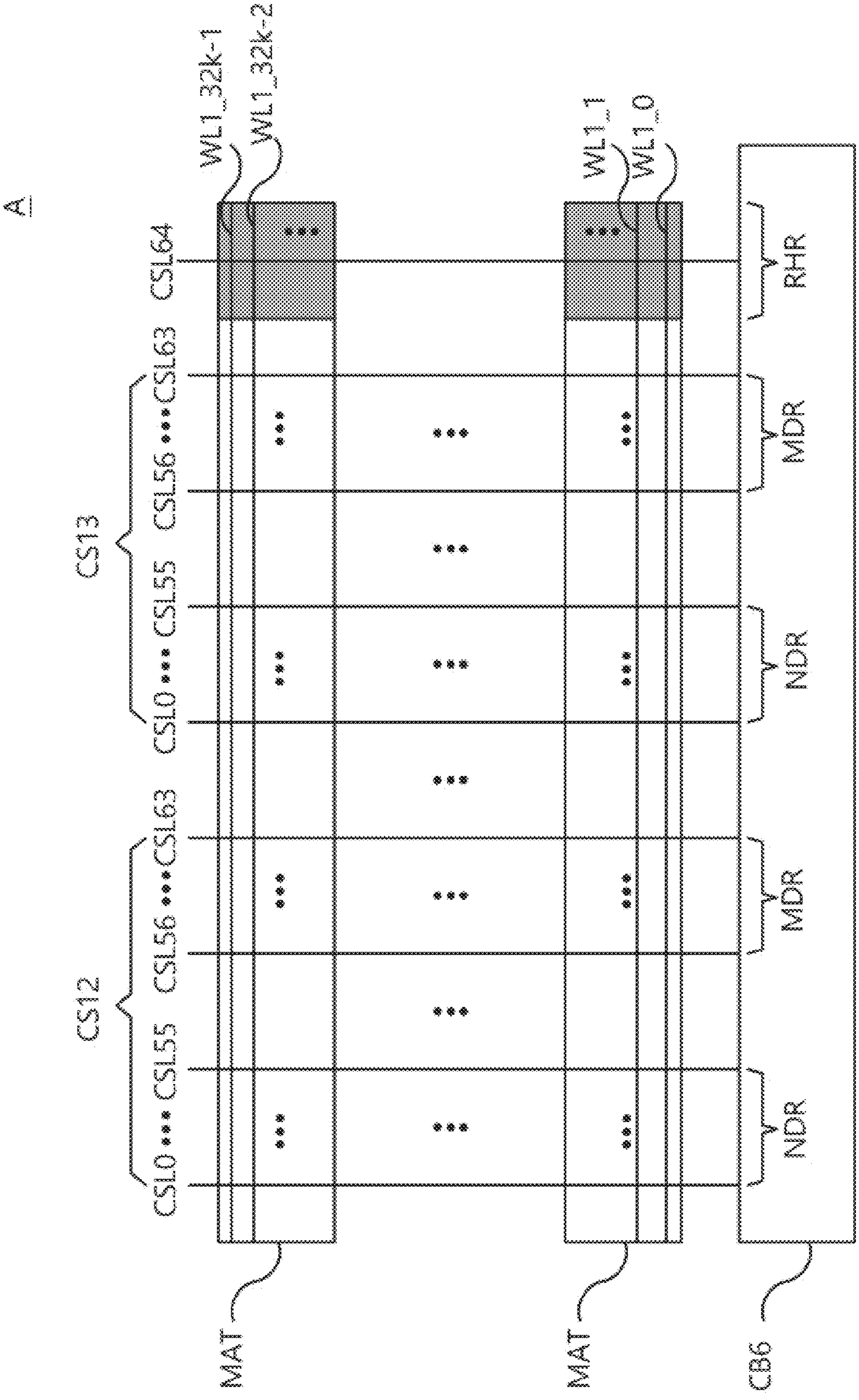
FIG. 17 is a more detailed view of area "A" of FIG. 16.

FIG. 16 is a diagram illustrating an example of a bank according to some implementations, and FIG. 17 is a more detailed view of area "A" of FIG. 16. A first bank B1 of FIG. 16 may correspond to the first bank B1 described in FIGS. 1 to 8. For ease of description, an example is provided in which a ratio of normal data and metadata is 8:1.

Referring to FIG. 16, the first bank B1 includes a 1_1-th sub-bank SB1_1 and a 2_1-th sub-bank SB2_1 disposed in a wordline direction.

The 1_1-th sub-bank SB1_1 may be electrically connected to a first row decoder RD1 and a first column decoder CD1. The 1_1-th sub-bank SB1_1 may be connected to a plurality of wordlines WL1_0 to WL1_32k−1 through the first row decoder RD1. In addition, the 1_1-th sub-bank SB1_1 may be connected to a plurality of column select lines CSL through the first column decoder CD1.

The 2_1-th sub-bank SB2_1 may be electrically connected to a second row decoder RD2 and a second column decoder CD2. The 2_1-th sub-bank SB2_1 may be connected to a plurality of wordlines WL2_0 to WL2_32k−1 through the second row decoder RD2. In addition, the 2_2-th sub-bank SB2_1 may be connected to a plurality of column select lines CSL through the second column decoder CD2.

Each of the 1_1-th sub-bank SB1_1 and the 2_1-th sub-bank SB2_1 includes a plurality of mats MAT. Each of the mats MAT may be connected to a portion of the wordlines and a portion of the column select lines CSLs. Each of the mats MAT may include a plurality of memory cells, and each of the memory cells may be connected to one of the wordlines connected to a corresponding MAT and one of the column select lines CSLs connected to a corresponding MAT.

The first column decoder CD1 includes a plurality of CSL blocks CB0 to CB7. Each of the plurality of CSL blocks CB0 to CB7 may be configured to select a column select line to be activated, among the plurality of column select lines, based on a column address decoded from the first column decoder CD1. Similarly, the second column decoder CD2 includes a plurality of CSL blocks CB0 to CB7. Each of the plurality of CSL blocks CB0 to CB7 may be configured to select a column select line to be activated, among the plurality of column select lines, based on a column address decoded from the second column decoder CD2.

In some implementations, each CSL block CB may correspond to two CSL groups CS. For example, the 0th CSL block CB0 may correspond to 0th and first CSL groups CS0 and CS1, and the first CSL block CB1 may correspond to second and third CSL groups CS2 and CS3. Similarly, the sixth CSL block CB6 may correspond to twelfth and thirteenth CSL groups CS12 and CS13, and the seventh CSL block CB7 may correspond to fourteenth and fifteenth CSL groups CS14 and CS15.

Each CSL group CS may include a plurality of column select lines. For example, each CSL group CS may include 64 column select lines. A portion of 64 column select lines may be assigned to a normal data region, and a portion thereof may be assigned to a metadata region.

An example of the sixth CSL block CB6 illustrated in FIG. 17 will be described in more detail. The sixth CSL block CB6 may be connected to the twelfth CSL group CS12 and the thirteenth CSL group CS13. The twelfth CSL group CS12 includes 0th to 63rd column select lines CSL0 to CSL63, and the thirteenth CSL group CS13 includes 0th to 63rd column select lines CSL0 to CSL63. Therefore, a total of 128 column select lines may be connected to the sixth CSL block CB6.

In the twelfth CSL group CS12, 0th to 55th column select lines CSL0 to CSL55 may be assigned to the normal data region NDR, and the remaining 56th to 63rd column select lines CSL56 to CSL63 may be assigned to the metadata region MDR. In the thirteenth CSL group CS13, 0th to 55th column select lines CSL0 to CSL55 may be assigned to the normal data region NDR, and the remaining 56th to 63rd column select lines CSL56 to CSL63 may be assigned to the metadata region MDR. As described above, a portion of the column select lines of each CSL group CS may be assigned to the normal data area NRD, and a portion thereof may be assigned to the metadata region MDR.

Continuing to refer to FIG. 16, a single column select line in a single CSL group CS may be selected and activated during a single access operation. Since two CSL groups CS correspond to a single CSL block CB, one or two column select lines may be selected by the single CSL block CB during a single access operation.

For ease of description, an example is provided in which a decoded column address is 'CSLx [a:b].' In some implementations, 'x' may refer to the number of a column select line, and '[a:b]' may refer to the range of a selected CSL group.

In addition, an example is provided in which a column address decoded by the first column decoder CD1 is 'CSL0 [0:15].' In some implementations, 0th to fifteenth CSL groups CS0 to CS15 may be selected, and a 0th column select line CSL0 may be selected in each of the 0th to fifteenth CSL groups CS0 to CS15. Since each CSL block CB corresponds to two CSL groups CS, each CSL block CB of the 1_1-th sub-bank SB1_1 may select two 0th column select lines CSL0. The two column select lines selected by each CSL block CB may be referred to as a 'CSL subset.'

In some implementations, the 0th to 55th column select lines CSL0 to CSL55 are assigned to the normal data area NDR, so that normal data may be input or output to the 1_1-th sub-bank SB1_1 when the decoded column address is CSL0 [0:15].

In addition, an example is provided in which a column address decoded by the second column decoder CD2 is 'CSL56 [0:1].' In some implementations, the 0th and first CSL groups CS0 and CS1 may be selected, and the 56th column select line CSL56 may be selected in each of the 0th and first CSL groups CS0 and CS1. Since the 0th CSL block CB0 corresponds to the 0th and first CSL groups CS0 and CS1, the 0th CSL block CB0 of the second sub-bank SB2_1 may select two 56th column select lines CSL56.

In some implementations, the 56th to 63rd column select lines CSL56 to CSL63 are assigned to the metadata region MDR, metadata may be input or output to the 2_1-th second sub-bank SB2_1 when the decoded column address is CSL56 [0:1].

In some implementations, a plurality of wordlines WL1_0 to WL1_32k−1 corresponding to the 1_1-th sub-bank SB1_1 may match a plurality of wordlines WL2_0 to WL2_32k−1 corresponding to the 2_1-th sub-bank SB2_1 to form wordline pairs. For example, the 1_0-th wordline WL1_0 and the 2_0-th wordline WL2_0 may form a 0th wordline pair, and the 1_1-th wordline WL1_1 and the 2_1-th wordline WL2_1 may form a first wordline pair.

In some implementations, metadata corresponding to normal data stored in the 1_1-th sub-bank SB1_1 may be stored in the 2_1-th sub-bank SB2_1, and the normal data and the metadata may correspond to the same wordline pair.

In addition, an example is provided in which the 1_0-th wordline WL1_0 and the 2_0-th wordline WL2_0 are selected by the first and second row decoders RD1 and RD2, and a ratio of normal data and metadata is 8:1.

In some implementations, when the column address decoded by the first column decoder CD1 is 'CSL0 [0:15],' the column address decoded by the column decoder CD2 may be 'CSL56 [0:1].' When the column address decoded by the first column decoder CD1 is 'CSL1 [0:15],' the column address decoded by the column decoder CD2 may be 'CSL56 [2:3].' Similarly, when the column address decoded by the first column decoder CD1 is 'CSL54 [0:15],' the column address decoded by the column decoder CD2 may be 'CSL56 [12:13].' When the column address decoded by the first column decoder CD1 is 'CSL55 [0:15],' the column address decoded by the column decoder CD2 may be 'CSL62 [14:15].' As a result, normal data corresponding to the 1_0-th wordline WL1_0 of the 1_1-th sub-bank SB1_1 may match metadata corresponding to the 2_0-th wordline WL2_0 of the 2_1-th sub-bank SB2_1.

As described above, a plurality of wordlines included in one sub-bank and a plurality of wordlines included in another sub-bank form wordline pairs, and thus a plurality of pieces of metadata for a plurality of normal data stored in the 1_1-th sub-bank SB1_1 may be distributed and stored in wordlines of the 2_1-th sub-bank SB2_1, and a plurality of pieces of metadata for the plurality of pieces of normal data stored in the 2_1-th sub-bank SB2_1 may be distributed and stored in wordlines of the 1_1-th sub-bank SB1_1. Accordingly, the plurality of pieces of metadata may be prevented from being distributed and stored in a specific wordline. As a result, a row hammer effect caused by an intensive access to a specific wordline may be suppressed.

Continuing to refer to FIG. 16 and FIG. 17, in some implementations, at least one of the sub-banks SB1_1 and SB2_1 included in the first bank B1 includes a row hammer region RHR, and the count data and/or count parity data for each wordline pair stored in the row hammer region RHR may be shared by the 1_1-th sub-bank SB1_1 and the 2_1-th sub-bank SB2_1.

For example, a mat MAT corresponding to the sixth CSL block CB6 of the 1_1-th sub-bank SB1_1 and a mat MAT corresponding to the seventh CSL block CB7 may be provided with a row hammer region RHR, as illustrated in FIG. 16.

In some implementations, a plurality of wordlines WL1_0 to WL1_31 of the 1_1-th sub-bank SB1_1 and a plurality of wordlines WL2_0 to WL2_31 of the 2_1-th sub-bank SB2_1 may form wordline pairs, and two wordlines included in each of the wordline pairs may be activated together. Therefore, a number of accesses to the plurality of wordlines WL1_0 to WL1_31 of the 1_1-th sub-bank SB1_1 and a number of accesses to the plurality of wordlines WL2_0 to WL2_31 of the 2_1-th sub-bank SB2_1 may be the same. Accordingly, the 1_1-th sub-bank SB1_1 and the 2_1-th sub-bank SB2_1 do not need to have the same count data and count parity data, and may share the count data and count parity data. As a result, an area occupied by the row hammer region required to prevent the row hammer effect may be significantly reduced.

Figure 18A:
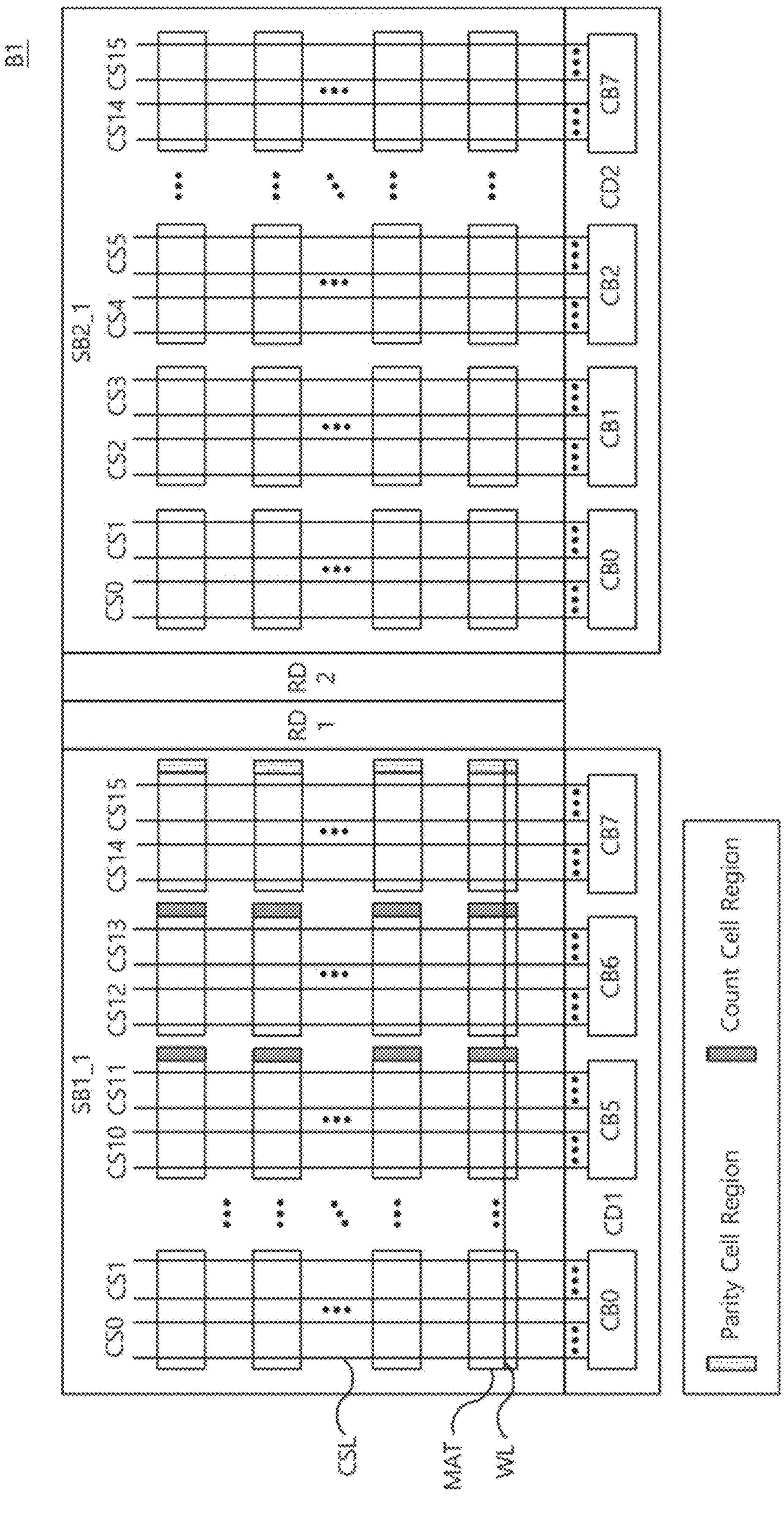
FIGS. 18A to 18C are diagrams illustrating various examples of a bank according to some implementations in which a row hammer region is disposed in various manners.
Figure 18B:
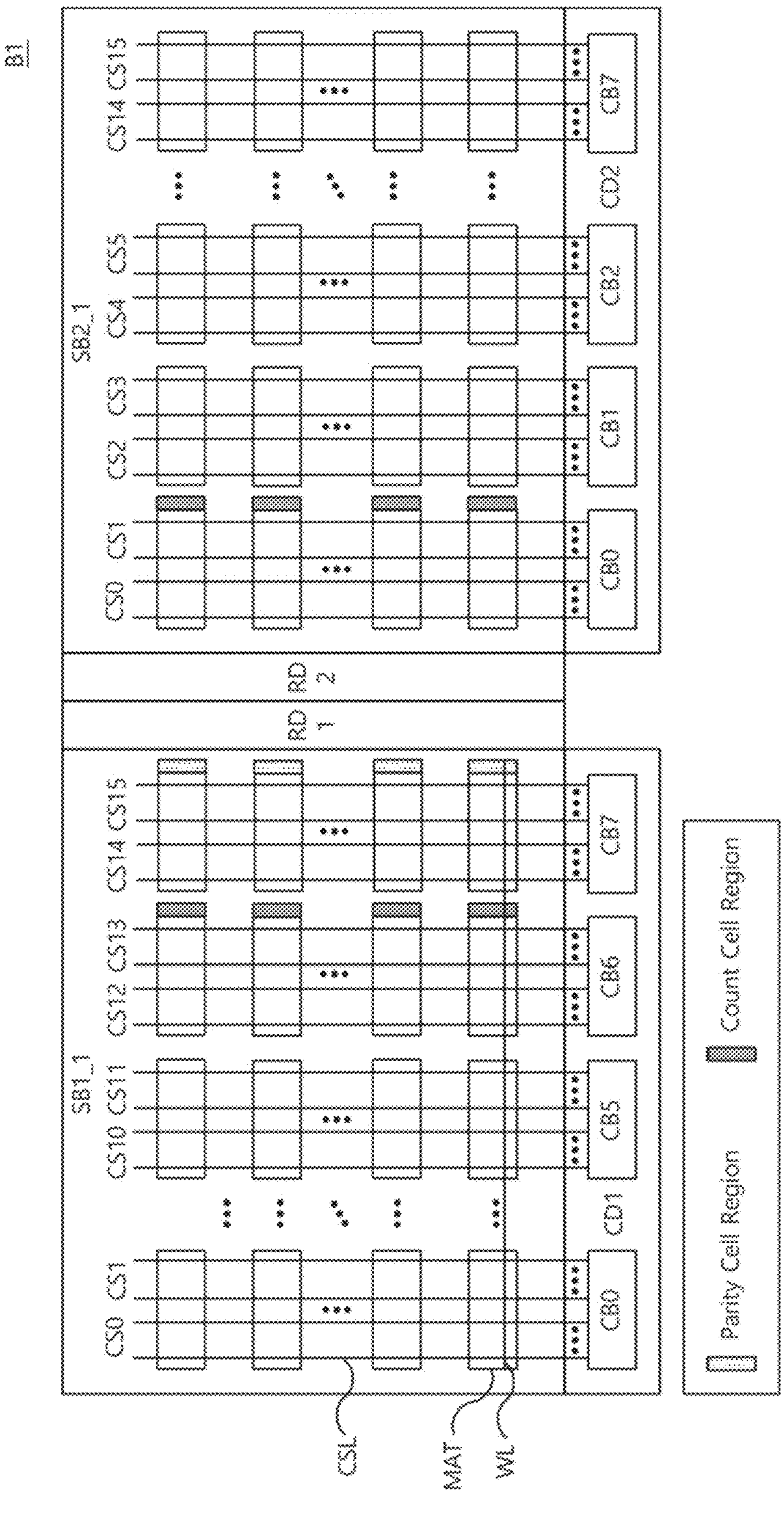
Figure 18C:
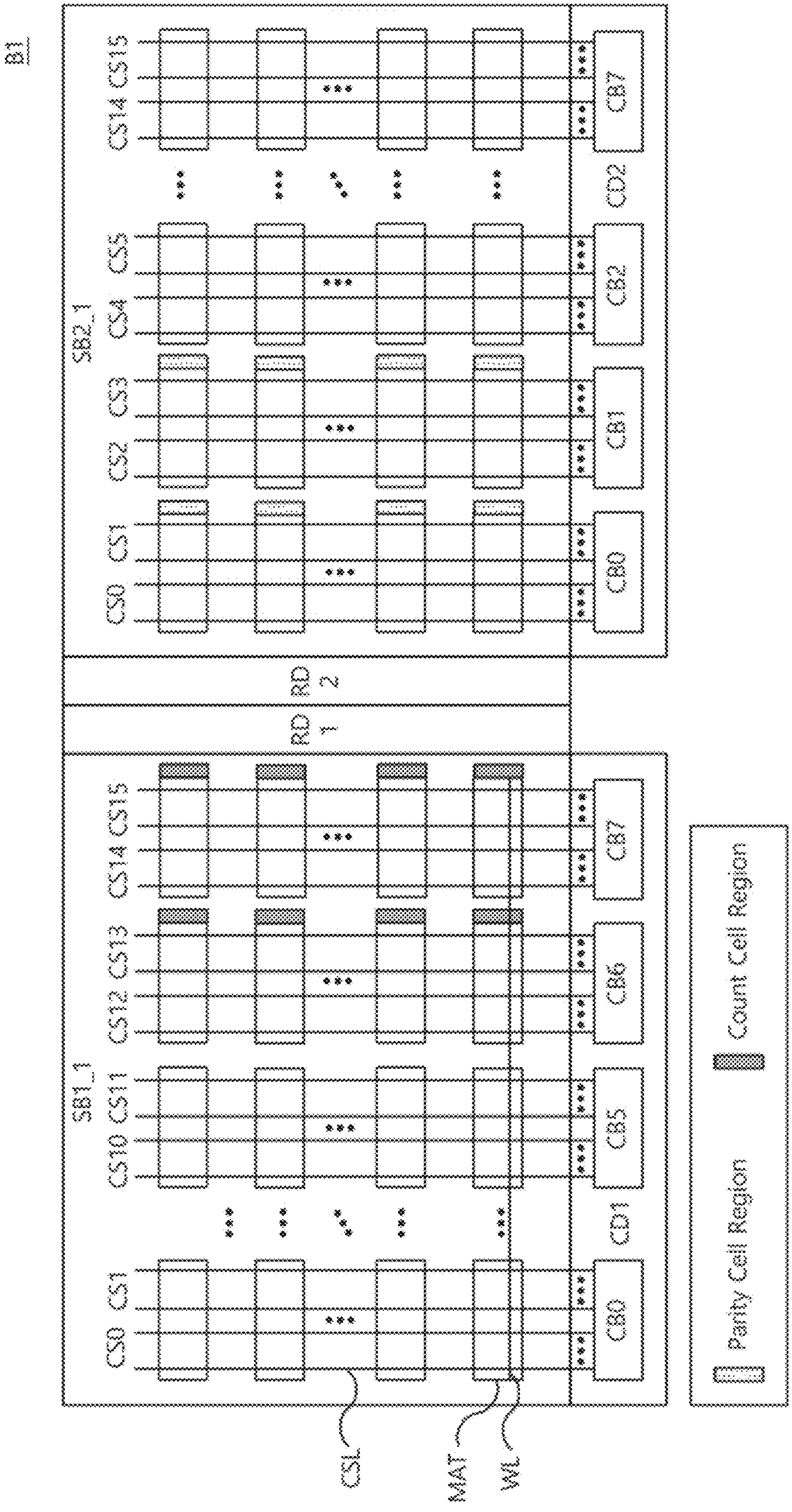

FIGS. 18A to 18C are diagrams illustrating various examples of a bank according to some implementations in which a row hammer region is disposed in various manners.

Referring to FIG. 18A to FIG. 18C, the row hammer region RHR (see FIG. 17) may include a parity cell region and a count cell region. In addition, a ratio and arrangement of the parity cell region and the count cell region may be changed according to some implementations. The parity cell region may refer to a region in which count parity cells are disposed, and the count cell region may refer to a region in which count cells are disposed.

For example, the ratio of the parity cell region and the count cell region may be 1:2, as illustrated in FIG. 18A. Both the parity cell region and the count cell region may be disposed in a single sub-bank SB1_1.

For example, the ratio of the parity cell region and the count cell region may be 1:2, as illustrated in FIG. 18B. Both the parity cell region may be arranged in a single sub-bank SB1_1. The count cell region may be distributed and disposed in a 1_1-th sub-bank SB1_1 and a 2_1-th sub-bank SB2_1.

For example, the ratio of the parity cell region and the count cell region may be 1:1, as illustrated in FIG. 18C. The parity cell region may be disposed in a single sub-bank SB2_1, and the count cell region may be disposed in arranged in a single sub-bank SB1_1.

In FIGS. 16 to 18, the ratio of the normal data and the metadata has been described as being 8:1. However, it should be understood that this is only an example, and implementations are not limited thereto. In some implementations, the ratio of the normal data and the meta count data may be set to N:1 (where N is a positive integer). For example, the ratio of the normal data and the meta count data may be set to 16:1.

As set forth above, a memory device according to some implementations may be implemented in a small area while preventing a row hammer effect.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination While implementations have been shown and described above, it will be apparent to those skilled in the art that modifications and variations could be made without departing from the scope of the present inventive concept as defined by the appended claims.

What is claimed is:

1. A memory device comprising at least one bank, the at least one bank comprising:

a first sub-bank comprising:

a plurality of first wordlines extending in a first direction; and a normal data region connected to the plurality of first wordlines, the normal data region configured to store normal data, a second sub-bank comprising:

a plurality of second wordlines extending in the first direction; and a metadata region connected to the plurality of second wordlines, the metadata region configured to store metadata of the normal data, wherein the plurality of first wordlines and the plurality of second wordlines are matched to form a plurality of wordline pairs, and wherein the at least one bank further comprises a row hammer region shared by the first sub-bank and the second sub-bank, the row hammer region configured to store a number of times the plurality of wordline pairs are accessed.

2. The memory device of claim 1, wherein the row hammer region comprises:

a plurality of count cells configured to store the number of times the plurality of wordline pairs are accessed; and a plurality of count parity cells configured to store count parity data corresponding to the plurality of count cells, and wherein the plurality of count cells and the plurality of count parity cells are disposed in the first sub-bank.

3. The memory device of claim 1, wherein the row hammer region comprises:

a plurality of count cells configured to store the number of times the plurality of wordline pairs are accessed; and a plurality of count parity cells configured to store count parity data corresponding to the plurality of count cells, and wherein the plurality of count cells are disposed in the first sub-bank, and the plurality of count parity cells are disposed in the second sub-bank.

4. The memory device of claim 1, wherein the row hammer region comprises:

a plurality of count cells configured to store the number of times the plurality of wordline pairs are accessed; and a plurality of count parity cells configured to store count parity data corresponding to the plurality of count cells, and wherein the plurality of count cells are disposed in both the first sub-bank and the second sub-bank, and the plurality of count parity cells are disposed in the second sub-bank.

5. The memory device of claim 1, wherein the first sub-bank and the second sub-bank correspond to different global input/output lines.

6. The memory device of claim 5, wherein, in response to a read operation being performed on the normal data stored in the normal data region, the normal data is output through a first global input/output line corresponding to the first sub-bank, and the metadata is output through a second global input/output line corresponding to the second sub-bank simultaneously with the normal data.

7. The memory device of claim 1, wherein the normal data region comprises a plurality of normal regions respectively connected to the plurality of first wordlines, the metadata region comprises a plurality of meta regions respectively connected to the plurality of second wordlines and matching the plurality of normal regions, and the row hammer region comprises a plurality of row count regions disposed in the first sub-bank and respectively connected to the plurality of first wordlines.

8. The memory device of claim 7, wherein each normal region of the plurality of normal regions corresponds to a plurality of first column select lines and a plurality of second column select lines, and a ratio of a number of the plurality of first column select lines and a number of the plurality of second column select lines is 8:1.

9. The memory device of claim 7, wherein each normal region of the plurality of normal regions corresponds to a plurality of first column select lines and a plurality of second column select lines, a ratio of a number of the plurality of first column select lines and a number of the plurality of second column select lines is 16:1.

10. The memory device of claim 1, wherein the normal data region comprises a plurality of normal regions respectively connected to the plurality of first wordlines, the metadata region comprises a plurality of meta regions respectively connected to the plurality of second wordlines and matching the plurality of normal regions, and the row hammer region comprises:

a plurality of first sub row count regions disposed in the first sub-bank and respectively connected to the plurality of first wordlines; and a plurality of second sub row count regions disposed in the second sub-bank and respectively connected to the plurality of second wordlines.

11. The memory device of claim 1, further comprising:

a row hammer management circuit configured to manage the number of times the plurality of wordline pairs are accessed, wherein the row hammer management circuit is configured to read, from the row hammer region, count data corresponding to a selected wordline pair among the plurality of wordline pairs, update the read count data, and re-store the updated count data in the row hammer region in response to activation of the selected wordline pair.

12. The memory device of claim 11, further comprising:

an error correction code (ECC) engine configured to read count parity data corresponding to the count data from the row hammer region and perform a decoding operation on the count data using the count parity data.

13. The memory device of claim 1, wherein the first sub-bank further comprises a metadata region connected to the plurality of first wordlines, the metadata region being configured to store metadata, and the second sub-bank further comprises a normal data region connected to the plurality of second wordlines, the normal data region being configured to store normal data.

14. A memory device comprising at least one bank, the at least one bank comprising:

a first sub-bank comprising:

a plurality of first wordlines extending in a wordline direction; and a plurality of first mats; and a second sub-bank comprising:

a plurality of second wordlines; and a plurality of second mats;

a first row decoder connected to the first sub-bank through the plurality of first wordlines;

a plurality of first column select lines;
a plurality of second column select lines;
a first column decoder connected to the first sub-bank through the plurality of first column select lines;
a second row decoder connected to the second sub-bank through the plurality of second wordlines; and
a second column decoder connected to the second sub-bank through the plurality of second column select lines,
wherein
each mat of the plurality of first mats comprises a normal data region connected to a portion of the plurality of first wordlines, the normal data region configured to store normal data,
each mat of the plurality of second mats comprises a metadata region connected to a portion of the plurality of second wordlines, the metadata region configured to store metadata corresponding to the normal data,
the plurality of first wordlines and the plurality of second wordlines are matched to form a plurality of wordline pairs, and
at least one of the plurality of first mats included in the first sub-bank comprises one or more count cells configured to store count data, the count data comprising a number of accesses to the plurality of wordline pairs.

15. The memory device of claim 14, wherein
at least one of the plurality of first mats included in the first sub-bank comprises one or more count parity cells configured to store count parity data for the count data.

16. The memory device of claim 15, wherein
a ratio of a number of the one or more count cells and a number of the count parity cells is 2:1.

17. The memory device of claim 14, wherein
at least one of the plurality of second mats included in the second sub-bank comprises one or more count parity cells configured to store count parity data for the count data.

18. The memory device of claim 14, wherein
the first sub-bank and the second sub-bank correspond to different global input/output lines.

19. The memory device of claim 14, wherein, in response to a read operation being performed on the normal data stored in the normal data region,
the normal data is output through a first global input/output line corresponding to the first sub-bank, and the metadata is output through a second global input/output line corresponding to the second sub-bank simultaneously with the normal data.

20. A memory system comprising:
a memory device comprising at least one bank, the at least one bank comprising:
a first sub-bank comprising:
a plurality of first wordlines; and
a normal data region connected to the plurality of first wordlines; and
a second sub-bank comprising:
a plurality of second wordlines; and
a metadata region connected to the plurality of second wordlines, the metadata region being configured to store metadata corresponding to the normal data; and
a memory controller configured to control the memory device,
wherein the plurality of first wordlines and the plurality of second wordlines are matched to form a plurality of wordline pairs, and
wherein the at least one bank further comprises a row hammer region shared by the first sub-bank and the second sub-bank, the row hammer region configured to store a number of accesses to the plurality of wordline pairs.

* * * * *